(12) United States Patent
Rodríguez Barros et al.

(10) Patent No.: US 8,568,005 B2
(45) Date of Patent: Oct. 29, 2013

(54) MULTI-SIGNAL EXTERNAL REAR-VIEW MIRROR ASSEMBLY FOR VEHICLES

(76) Inventors: Alejandro Rodríguez Barros, Barcelona (ES); José Rodríguez Fernández, Barcelona (ES)

(*) Notice: Subject to any disclaimer, the term of this patent is extended or adjusted under 35 U.S.C. 154(b) by 284 days.

(21) Appl. No.: 12/837,617

(22) Filed: Jul. 16, 2010

(65) Prior Publication Data

US 2011/0001428 A1  Jan. 6, 2011

Related U.S. Application Data

(63) Continuation of application No. PCT/ES2009/000017, filed on Jan. 16, 2009.

(30) Foreign Application Priority Data

Jan. 16, 2008 (ES) .................. 200800098

(51) Int. Cl.
*B60Q 1/26* (2006.01)
*F21S 8/10* (2006.01)

(52) U.S. Cl.
USPC ............................. 362/494; 362/540; 362/545

(58) Field of Classification Search
USPC .......................... 362/494, 540, 545; 340/575
See application file for complete search history.

(56) References Cited

U.S. PATENT DOCUMENTS

| | | | |
|---|---|---|---|
| 6,280,068 B1 | 8/2001 | Mertens et al. | |
| 6,926,432 B2* | 8/2005 | Rodriguez Barros et al. | 362/494 |
| 6,986,596 B2* | 1/2006 | Evans | 362/494 |
| 7,080,913 B2* | 7/2006 | Henion et al. | 359/864 |
| 7,674,025 B2* | 3/2010 | Liesener | 362/494 |
| 7,850,350 B2* | 12/2010 | Weller et al. | 362/494 |
| 2001/0010633 A1 | 8/2001 | Apfelbeck | |
| 2003/0206417 A1* | 11/2003 | Pastrick et al. | 362/494 |
| 2005/0265037 A1* | 12/2005 | Newton et al. | 362/494 |
| 2006/0012990 A1 | 1/2006 | Walser | |
| 2007/0279923 A1 | 12/2007 | Rodriguez | |

FOREIGN PATENT DOCUMENTS

| | | |
|---|---|---|
| ES | 2139486 A1 | 2/2000 |
| WO | 2004024502 A1 | 3/2004 |
| WO | 2007080439 A1 | 7/2007 |
| WO | 2009090285 A1 | 7/2009 |

* cited by examiner

*Primary Examiner* — Peggy A. Neils
(74) *Attorney, Agent, or Firm* — Hess Patnt Law Firm LLC; Robert J. Hess

(57) ABSTRACT

A multi-signal exterior rear-view mirror assembly that includes:
a structural part forming a perimetric frame (Fr) defining the contour of a first opening towards the rear (Op1), which encompasses a main reflective plate glass (G1);
a second front opening (Op2) in an area opposite or adjacent to the main plate glass (G1),
a first light module (D1) suitable for emitting a first turn signal through the second opening (Op2) towards the front and towards the side,
and
a second light module (D2, D2G) suitable for emitting a second turn signal towards the rear synchronized with the first turn signal for producing one and the same function, the second light module (D2, D2G) being independent in construction from the first light module (D1), and being located in a portion of the structural part (Fr) forming a perimetric frame or in a portion of an adjacent part.

18 Claims, 28 Drawing Sheets

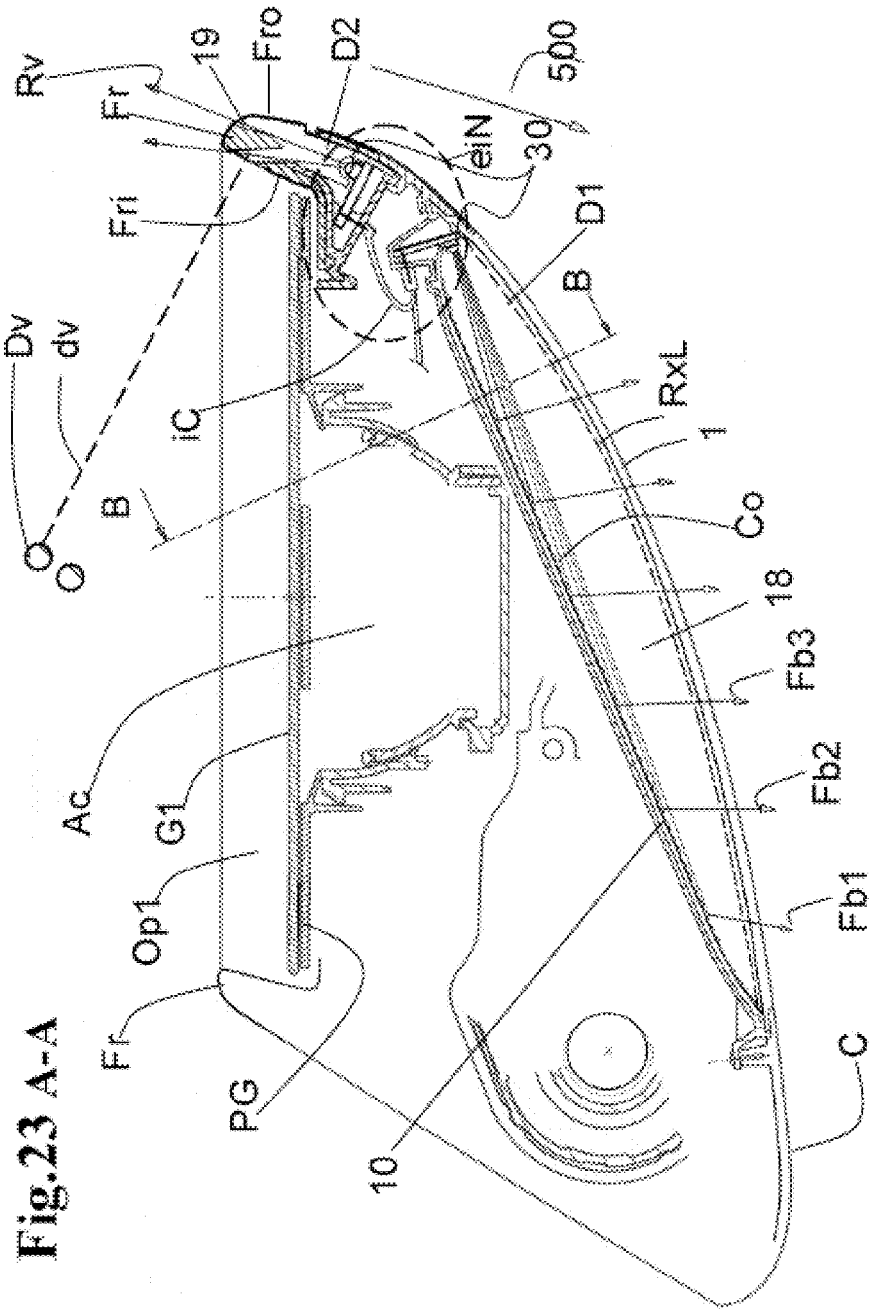
Fig.23 A-A

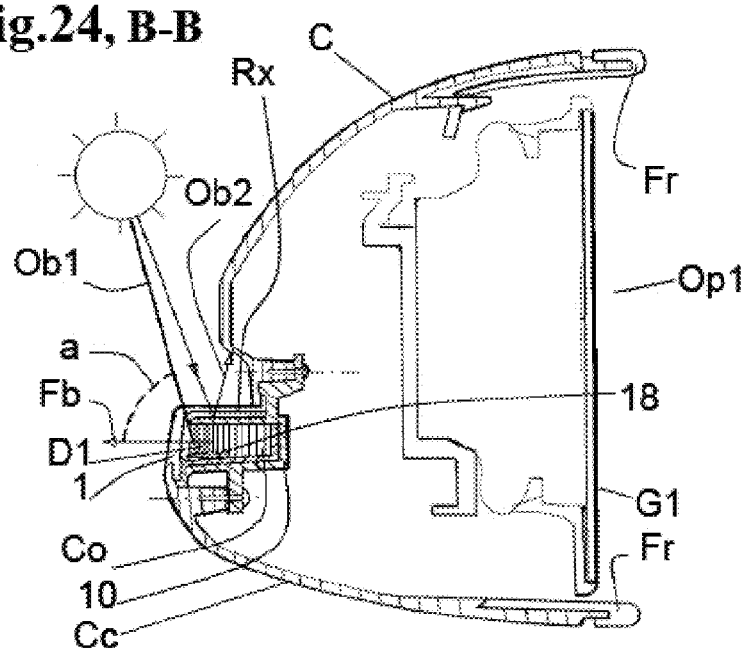
Fig.24, B-B
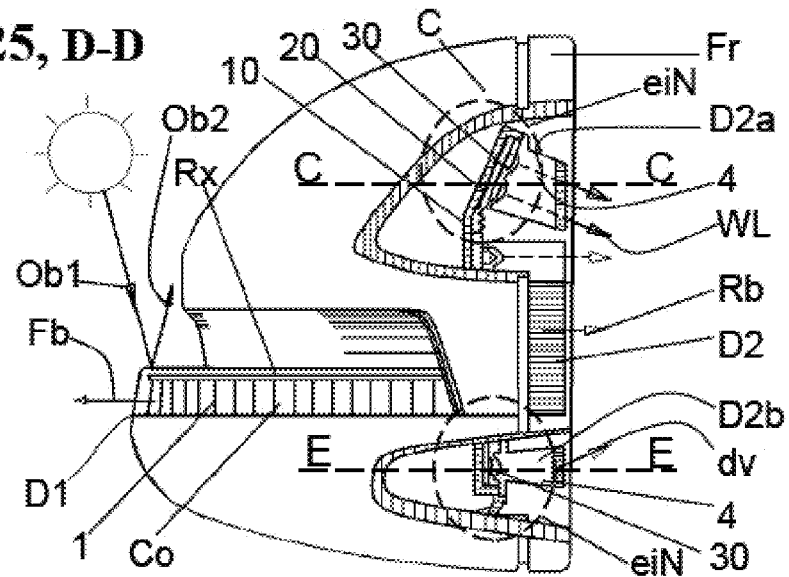
Fig.25, D-D

Fig. 26, C-C
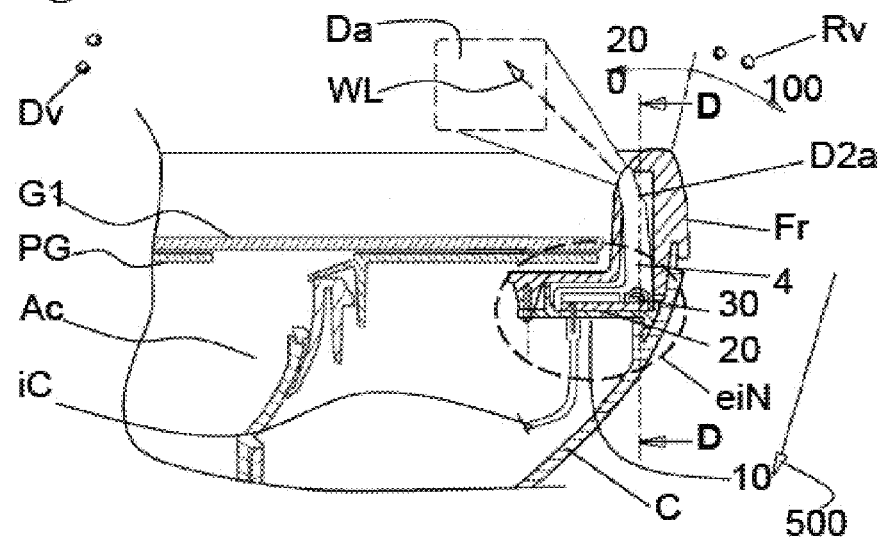
Fig. 27, E-E
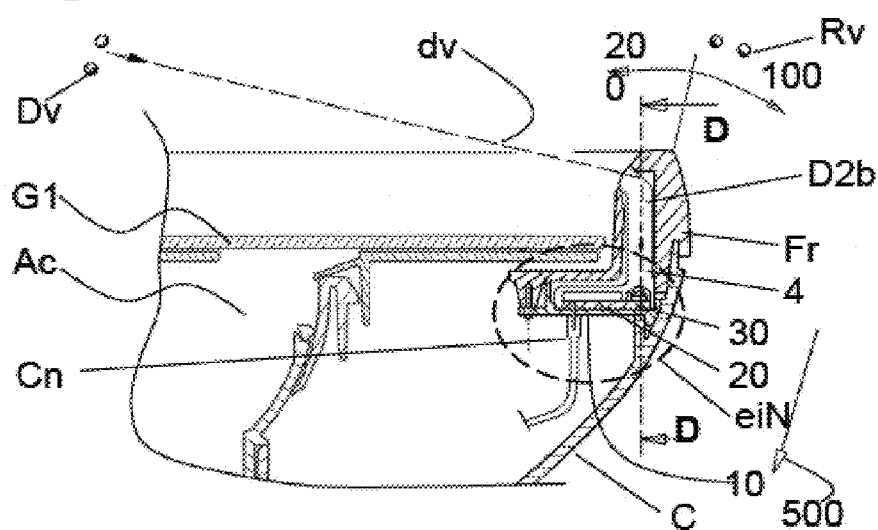

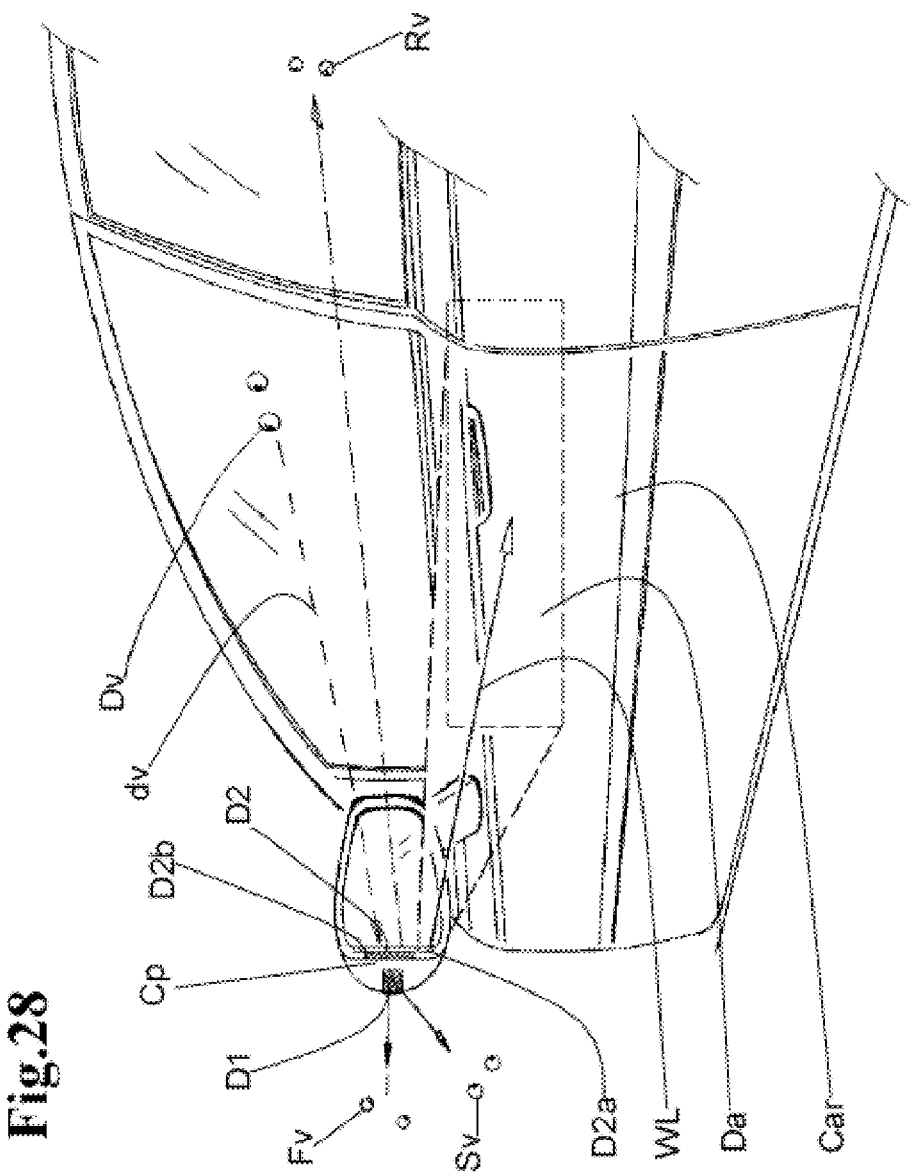

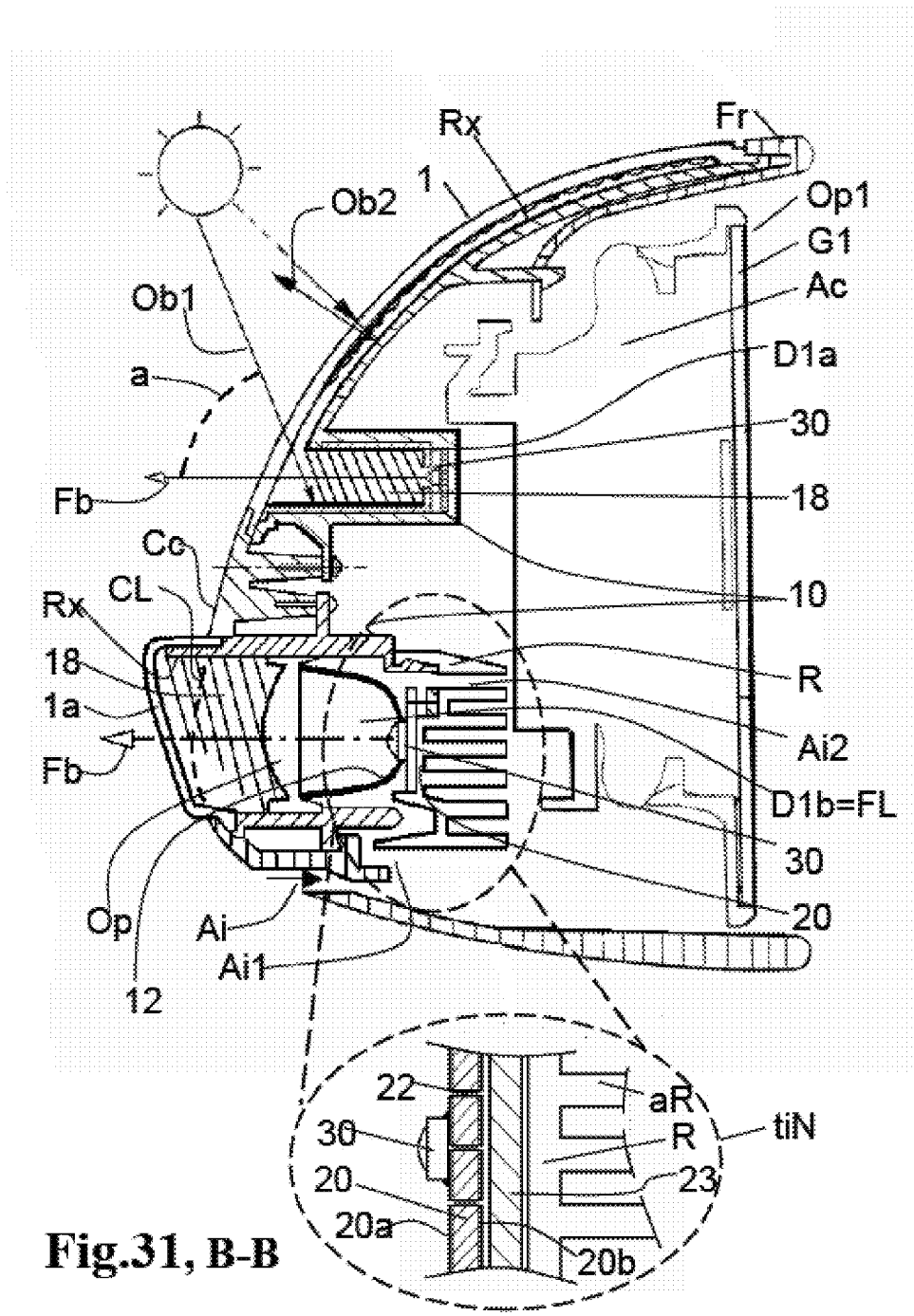
Fig.31, B-B

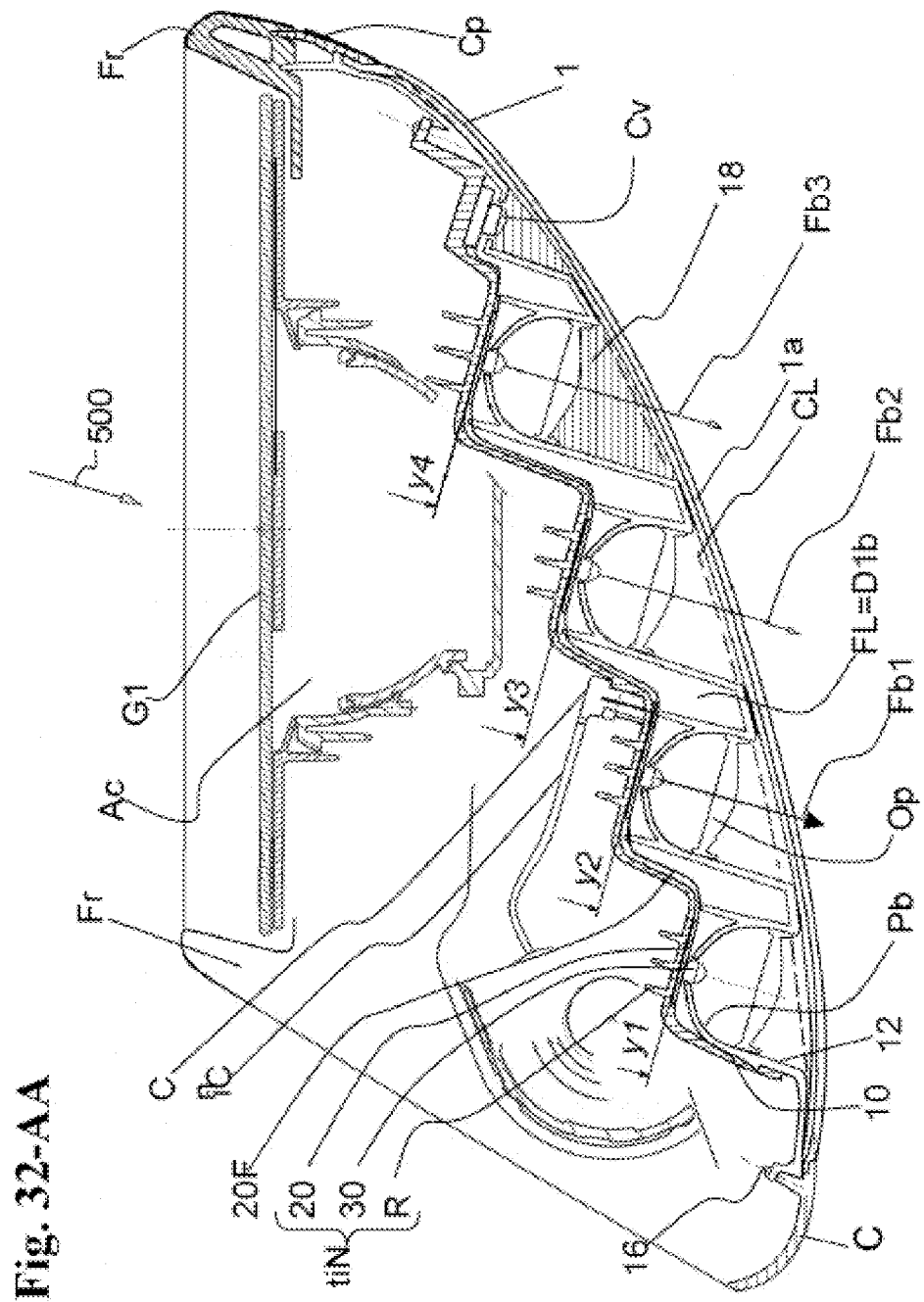
Fig. 32-AA

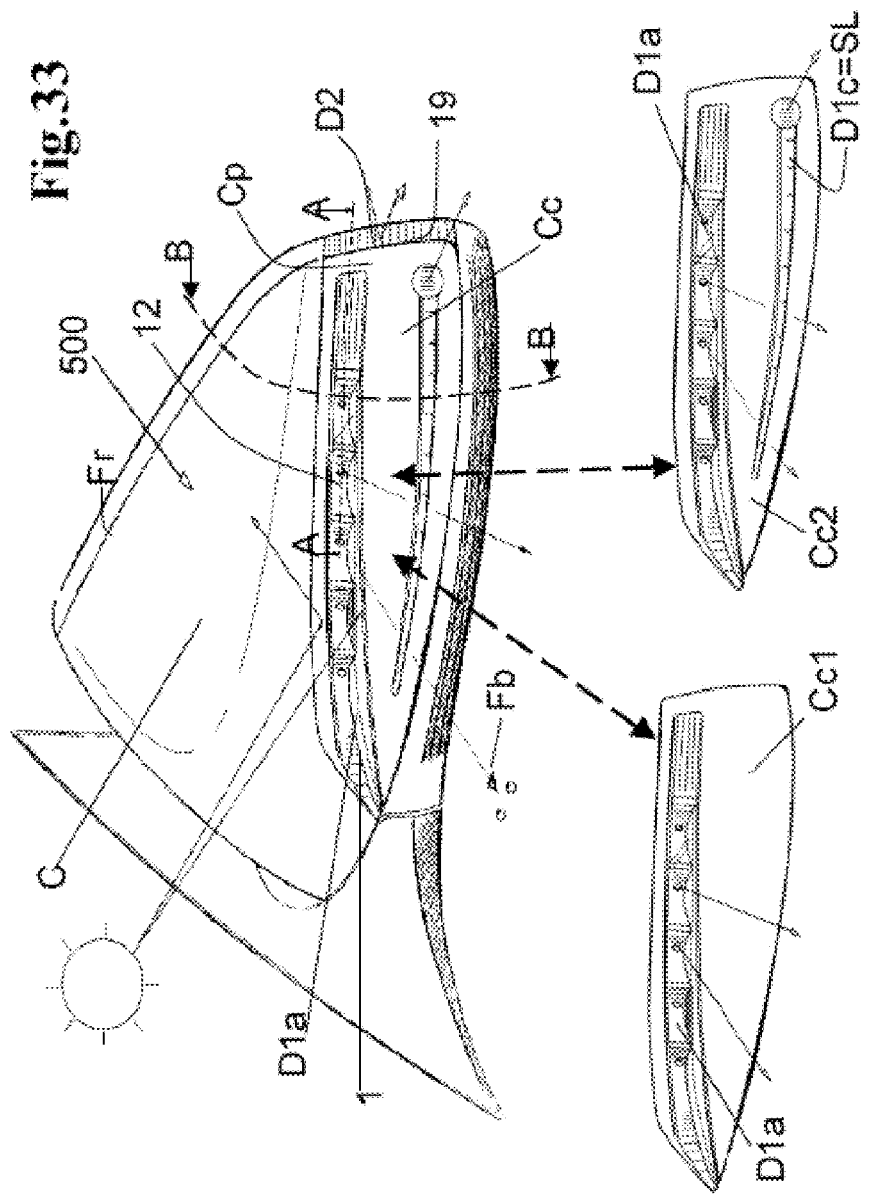

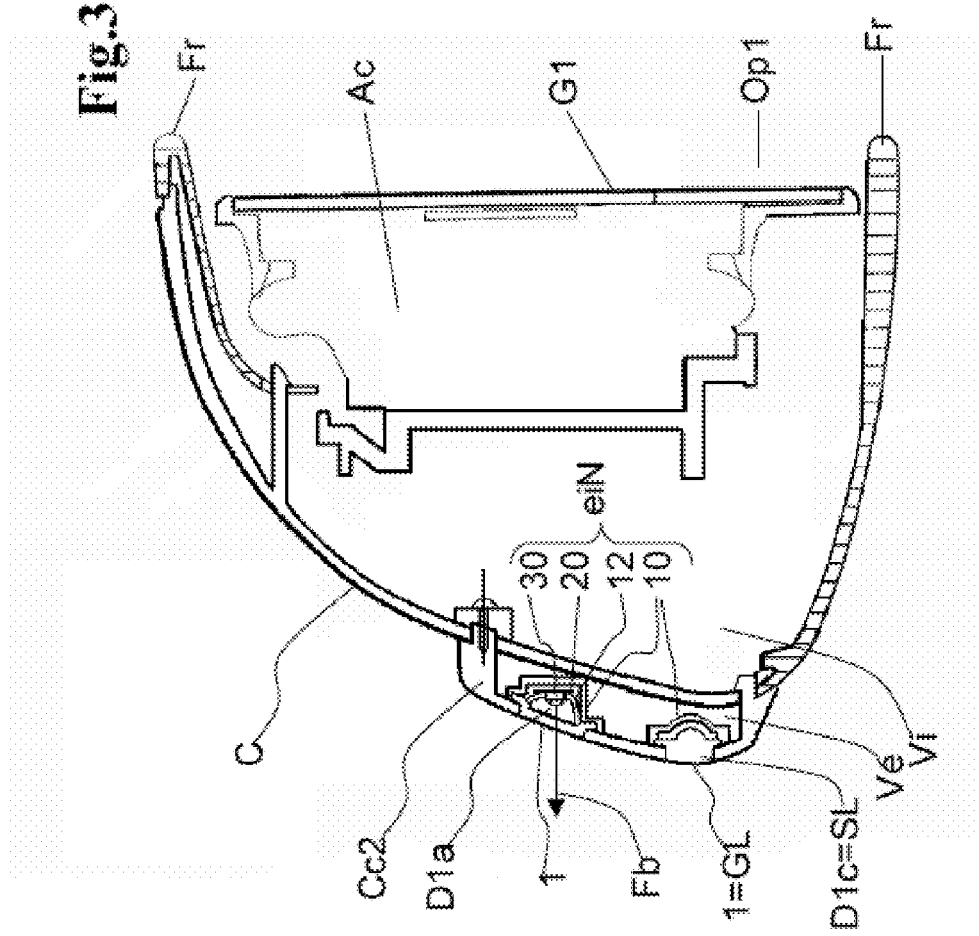

MULTI-SIGNAL EXTERNAL REAR-VIEW MIRROR ASSEMBLY FOR VEHICLES

CROSS-REFERENCE TO COPENDING PATENT APPLICATIONS

The present application is a continuation-in-part of international patent application serial no. PCT/ES2009/000017 filed Jan. 16, 2009.

FIELD OF THE ART

The present invention generally relates to a multisignal exterior rear-view mirror assembly for a vehicle suitable for emitting at least one turn light signal in three directions, i.e., towards the front, towards the side and towards the rear, and particularly to a rear-view mirror assembly with a first light module arranged in a front part, in an area opposite the main plate glass, and suitable for emitting a first turn signal towards the front and towards the side, and a second light module, independent in construction from the first light module and located in a structural part which excludes said front part, and suitable for emitting a second turn signal at least towards the rear, synchronized with said first turn signal for producing one and the same function.

PRIOR STATE OF THE ART

Rear-view mirror assemblies with a built-in turn signal emitting said signal in three directions, i.e., towards the front, towards the side and towards the rear, are known on the market and by several patent documents. In order to produce these three emission directions of one and the same signal, these rear-view mirrors have a single light module emitting through a window closed by an outer transparent cover extending from the front part, opposite the main plate glass, to the end farthest from the bodywork, where they have a projection, unevenness or a shape which allows emitting the light towards the rear.

The resulting shape of said transparent cover and of the light module, or signal device, is an elongated curved part, the same as its inner parts, and it extends over the front and side perimeter of the rear-view mirror, which involves a variety of problems, such as:

- The molds of the elongated curved parts have cavities varying in angle along their extension, their demolding is complicated and expensive.
- Said curved parts are more unstable, have deformations, stresses, and it is difficult to make them match up during their assembly.
- The attachment of curved parts by welding is complicated; the curved weld edge produces deformations, water inlets and the risk that the device will be rendered useless in a short time.
- The curved shape of the device means that some point will receive a greater incidence of outdoor light on the emitters themselves, which in some situations causes the signal to be unnoticeable during the day.
- The projection of said transparent cover coincides with the most projecting area of the vehicle on the sides, susceptible of receiving blows, suffering damages.
- The projection of said transparent cover produces a complicated assembly of parts and aerodynamic noise.
- Each rear-view mirror has an outer curve and a different inclination, this prevents standardizing parts for being reused in different vehicles; and involves more development time, higher cost of molds, parts and tools.
- It is important to provide the vehicle with locaters so that it is visible during the day, at night, from the front and from its dark side, to see the door, to see its handle when getting in the vehicle, which are functions that are hard to integrate if they form part of a curved and single device due to the additional cavities.
- It is important to have operating indicator lights close to the plate glass or rear-view mirror, the indications of said indicators reflect the state of peripheral systems of detection or intercommunication which involve looking towards the back using said plate glass, said indicator light facilitates locating the respective plate glass.

One of such rear-view mirror assemblies incorporating a single curved light module is described in U.S. Pat. No. 6,280,068, which contains a partition dividing the interior thereof into two chambers, one housing a light emitting device for emitting a turn light signal towards the rear and another one housing another light emitting device for emitting a turn light signal towards the front, but both chambers sharing one and the same common transparent cover.

Another rear-view mirror assembly with a single curved light module for emitting a turn light signal towards the front, the side and towards the rear, is described in the patent application US2001010633A1, which in paragraph [18] describes how its light-transmitting plate 13 is fixed, for example by welding, by its peripheral rim 14 to the rim of the casing 12 of the lighting unit. The difficulty of welding such curved parts has already been mentioned above.

The present applicant is not aware of proposals which solve the aforementioned problems affecting the known rear-view mirror assemblies emitting light towards the front, the side and the rear by means of using a single light module with a large curvature.

DESCRIPTION OF THE INVENTION

It is necessary to solve the problems not covered in the current state of the art by means of providing a multisignal rear-view mirror assembly based on including at least two light modules independent in construction, but associated such that a first one of them emits a first turn light signal towards the front and the side and a second light module emits a second turn light signal towards the rear synchronized with the first, thus preventing the problems caused by light modules with a large curvature used in the state of the art for carrying out the light emission in the three directions mentioned, including those referring to the manufacture and assembly of the curved parts forming them, as well as the difficulty of standardization when using them in different rear-view mirror assemblies, since many rear-view mirror assemblies of different vehicles have equal or very similar structural parts such as the frame or portions of the frame which encompasses the main plate glass thereof, one or both light modules of the rear-view mirror assembly proposed by the invention being able to be standardized for a plurality of said rear-view mirror assemblies of different vehicles.

In other words, the inclusion of at least two light modules in the rear-view mirror assembly proposed by the invention allows having a more robust and compact construction, using fewer molds, having a more planar design of the attachments for better welding between parts, as well as being reusable in different rear-view mirrors.

The present invention relates to an exterior multisignal rear-view mirror assembly for a vehicle, comprising:

a structural part forming a perimetric frame defining the contour of a first opening towards the rear, with reference to the axis of travel of the vehicle in its normal traveling direction, which encompasses a main reflective plate glass;

at least one second front opening or window for the passage of light in an outer wall of a casing of said rear-view mirror assembly, or between half-casings, in an area opposite said main plate glass;

a first light module suitable for emitting at least one first turn signal through said second opening or window for the passage of light, encompassing a light emitting extension at least in a horizontal plane between a direction towards the front and towards the side, with reference to said axis of travel of the vehicle in its normal traveling direction; and a second light module suitable for emitting at least one second turn signal at least towards the rear, synchronized with said first turn signal for producing one and the same function, said second light module being independent in construction from the first light module, and being located in a portion of said structural part forming a perimetric frame or in a portion of a part of the rear-view mirror assembly adjacent to said structural part forming a perimetric frame.

For one embodiment, said light modules are electrically interconnected and controlled by a control system for emitting their respective light signals in unison or synchronously.

In the present specification, casing of the rear-view mirror assembly is understood as a structural assembly comprising at least one of the following structural elements, or a combination thereof: said and/or other structural parts, at least one casing cover and one or more half-casings.

Said portion of said structural part forming a perimetric frame where said second light module is located is comprised, for one embodiment, in the outer third of said rear-view mirror assembly farthest from the bodywork of the vehicle, and is preferably the portion of the structural part farthest from the bodywork of the vehicle, visible from the rear on an axis passing through said rear-view mirror assembly and is parallel to said axis of travel of the vehicle.

The portion of said structural part forming a perimetric frame defines an outer, inner or central recess, depending on the embodiment in which the second light module is housed, preferably without projecting from the outer contour of the perimetric frame.

For another embodiment, the second light module abuts with an area of the inner contour of said portion of said structural part forming a perimetric frame.

For the case in which the second light module is not arranged in the structural part forming a perimetric frame, but rather in the mentioned adjacent part, for a preferred embodiment of said case this is a supporting part of the main plate glass or of an auxiliary plate glass G2 adjacent to said main plate glass, said supporting part generally though not in a limiting manner being a frame-plate glass holding plate assembly.

Each of the mentioned light modules comprises a transparent or translucent part including at least one outer cover through which the respective light signals exit towards the exterior.

For one embodiment, the outer transparent or translucent covers are separated by an opaque wall between the first and the second light module, said opaque wall covering part of the inner structure or interface of at least one of said light modules.

The mentioned opaque wall interpolated between both light modules, generally a structural opaque part of the rear-view mirror, acts as a protective cover for protection against blows and scratches, which furthermore allows the light contrast with respect to the incidence of the exterior rays during the day on its respective electro-optical interface integrated by the elements forming the light source, optical devices, reflectors and other elements included in the LED light modules, circuits, intermediate optical devices, light guides, collimators, reflectors, parabolas.

Depending on the embodiment, said opaque wall forms part of an element of the rear-view mirror assembly of the group including the following elements: part of said casing of the rear-view mirror, a complementary cover, part of said first light module or of said second light module or of another light module.

The independence between said first and second modules allows incorporating in the first module other signals in order to have better perception of the vehicle seen from the front during the day, or seen from the side on its dark side at night, and in the second module towards the rear, a welcome light which lights up the door of the vehicle in the area of the handle and operating indicator lights of related signals or systems to look towards the rear using the respective rear-view mirror.

In other words, the light modules included in the rear-view mirror assembly proposed by the invention are suitable not only for producing the mentioned turn signals but rather also for producing locating signals and operating indicators of peripheral detection systems of said vehicle, which facilitate:

Locating the vehicle as it includes a second signal visible from the front during the day or at night.

Locating the vehicle as it includes a third signal visible from its dark side at night.

Locating and lighting up the door before getting in the vehicle by means of the second associated module which emits light towards the rear.

Obtaining an operating indicator light of said blinking signal

Obtaining an operating indicator light of a peripheral sensor—detector system of said vehicle.

The independence of interconnected modules allows rotating and varying their position with respect to one another in order to be adapted to the curved areas of different casings of rear-view mirrors and to reuse said modules in different rear-view mirrors.

For one embodiment, the first light module is suitable for emitting:

a first signal which is part of the turn signal and is emitted towards the front and the side simultaneously with the associated module oriented towards the rear.

a second front locating signal continuously switched on, visible from the front of the vehicle for its perception during the day or at night.

a third side locating signal continuously switched on, visible from the dark side taken up by said protective cover which does not emit light.

For the same embodiment, the second light module is suitable for emitting:

a first signal which is part of the turn signal and is emitted towards the rear and the side, simultaneously with the associated module oriented towards the front.

a light which lights up the door of the vehicle before getting in.

an operating indicator light which emits in at least one light color the state of peripheral systems related to looking towards the rear using said mirror.

an operating indicator light using the same light of the turn signal deflected by an optical member.

BRIEF DESCRIPTION OF THE DRAWINGS

The features of the invention will be better understood from the attached illustrative and non-limiting drawings. It is understood that a person skilled in the art can obtain a similar product based on such drawings by association or relating similar elements, or by varying the design, without departing from the scope of the present invention.

Figure 1:
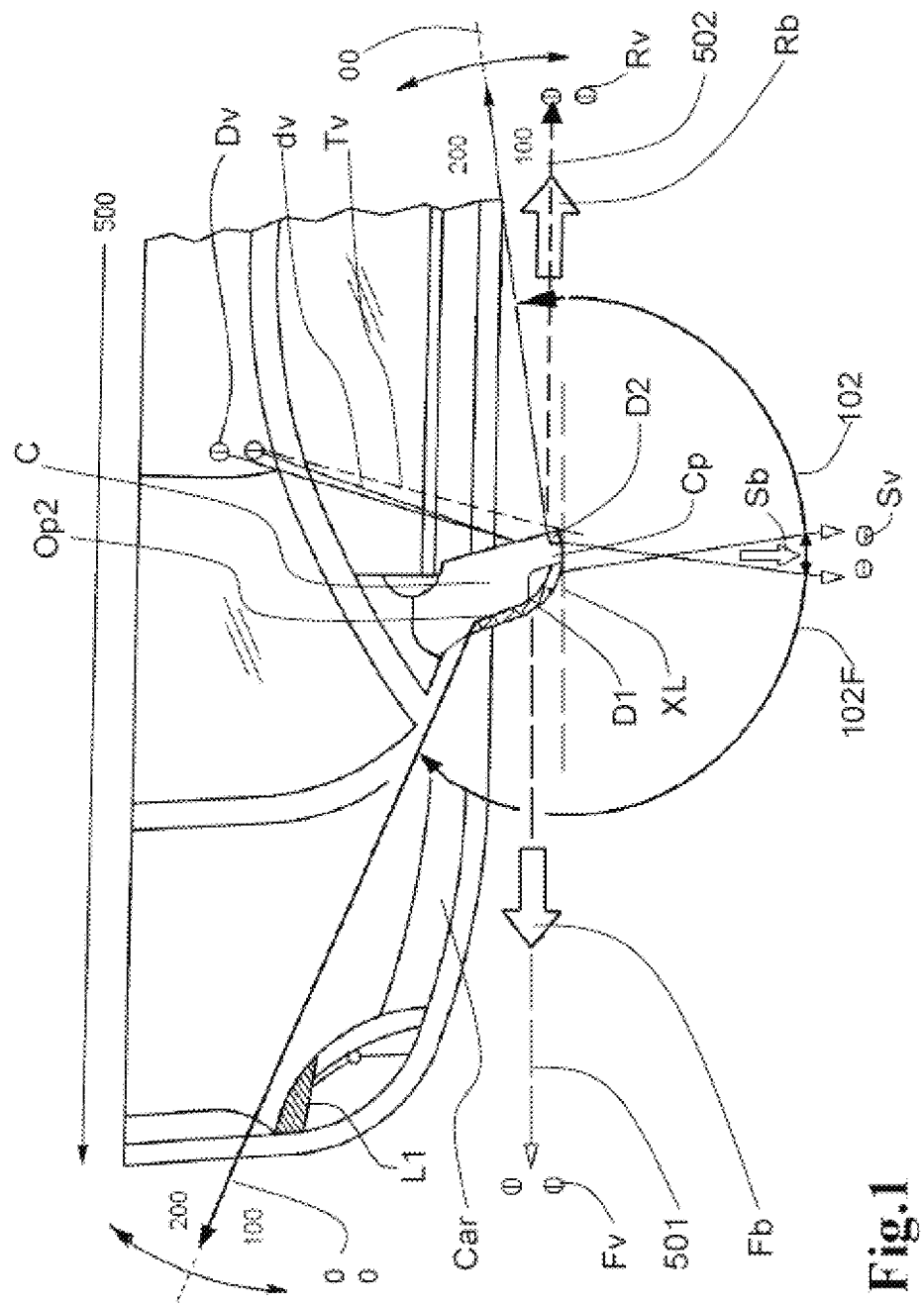
FIG. 1 is a top view of a fourth of a vehicle with an axis of travel 500, an extreme side line XL, outer front, side and rear points of view Fv, Sv, Rv and inner or driver points of view Dv; and the multisignal exterior rear-view mirror assembly proposed by the invention, where a lit horizontal field 100 and an unlit horizontal field 200 can be seen, within the latter, a signal pattern emitted by a first module D1 towards the front 102a, combined with one of a second module D2 which emits towards the rear 102, on an axis towards the rear 502 parallel to the axis of travel 500 for the same turn signal.
Figure 2:
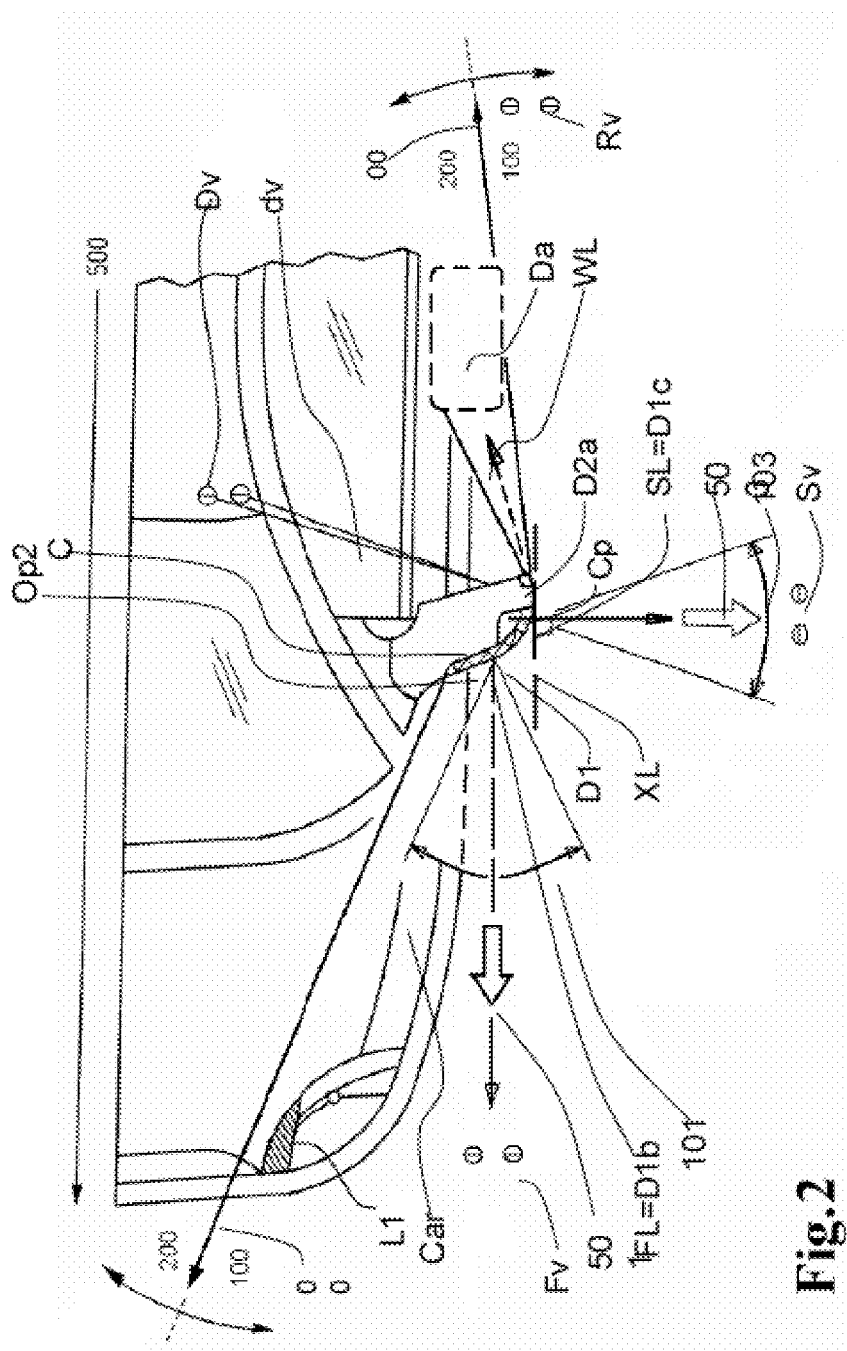
FIG. 2 is a top view similar to that of FIG. 1, showing the horizontal emission pattern of the front signal FL on an axis 501 parallel to the axis of travel, the emission pattern of the side signal SL on an axis 503 perpendicular to the axis of travel and a light beam towards the door WL which lights up an area Da of the bodywork Car.
Figure 7:
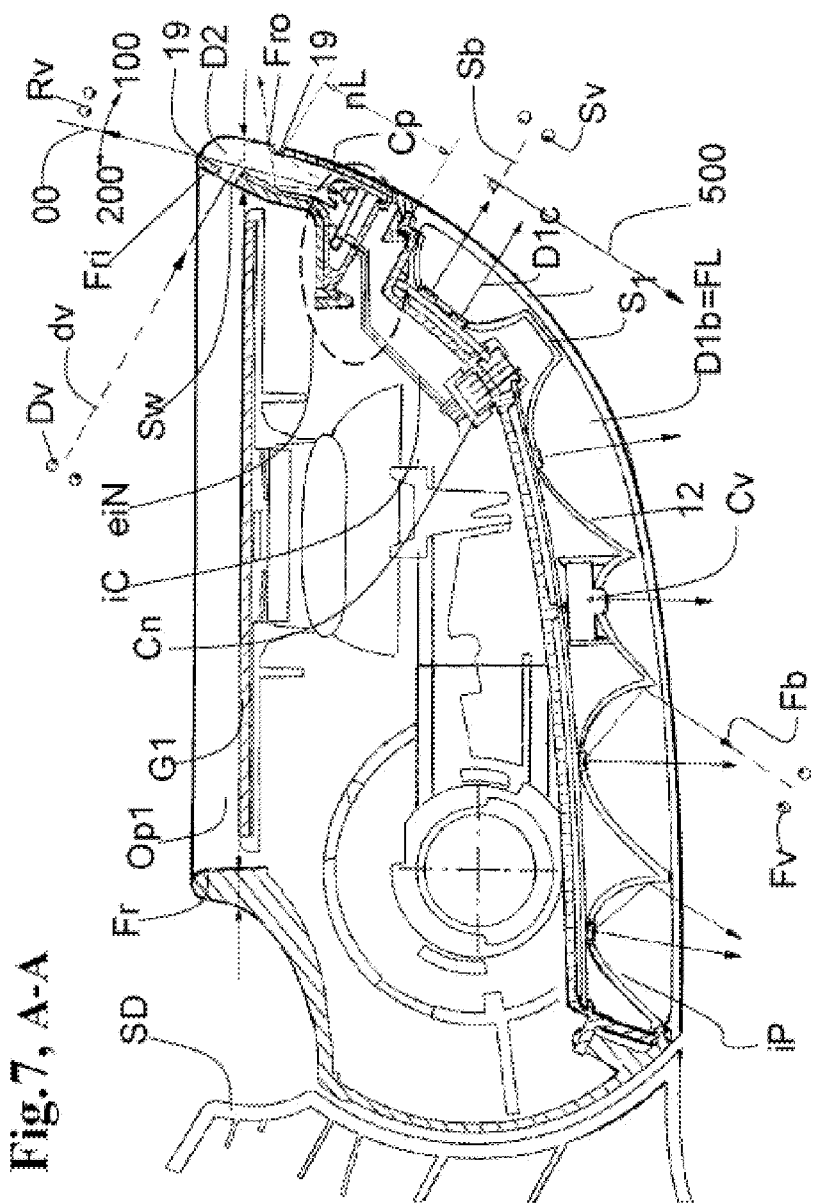
FIG. 7 is a cross-section view taken along line A-A of FIG. 6 on the cavities of a front module D1b corresponding to the front signal FL separated by a surface S from the side signal SL which in turn emits light along an optical axis Sb perpendicular to the axis of travel 500 of said vehicle.
Figure 10:
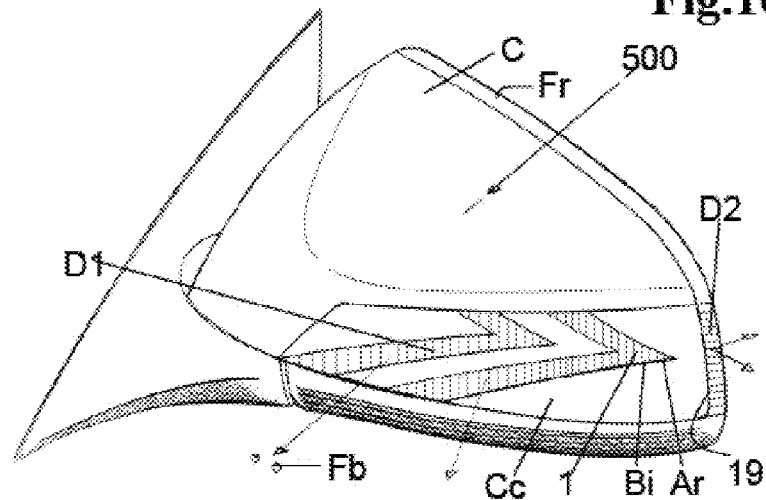
Figure 11:
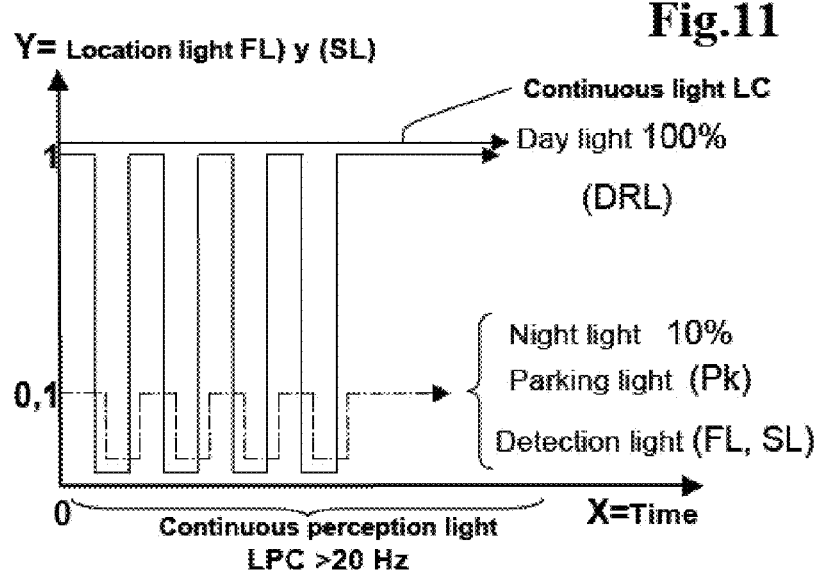
Figure 12:
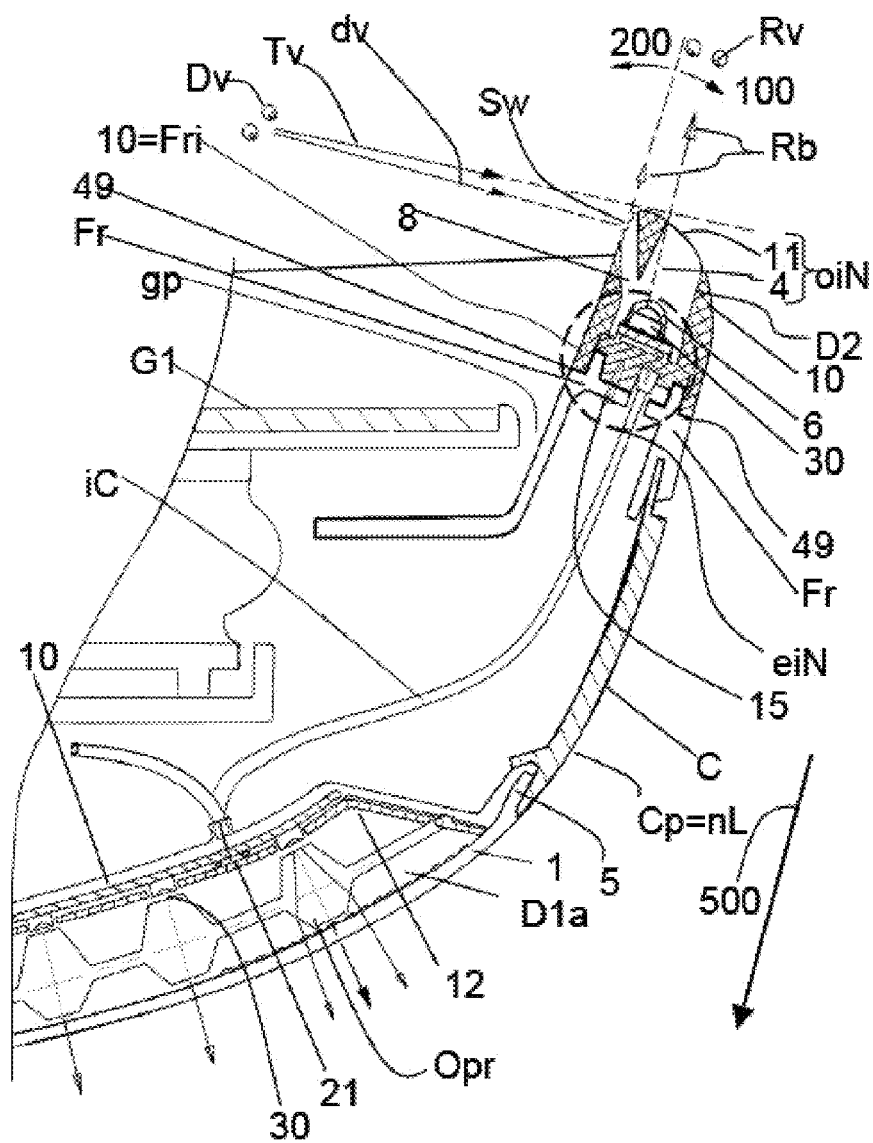
Figure 13:
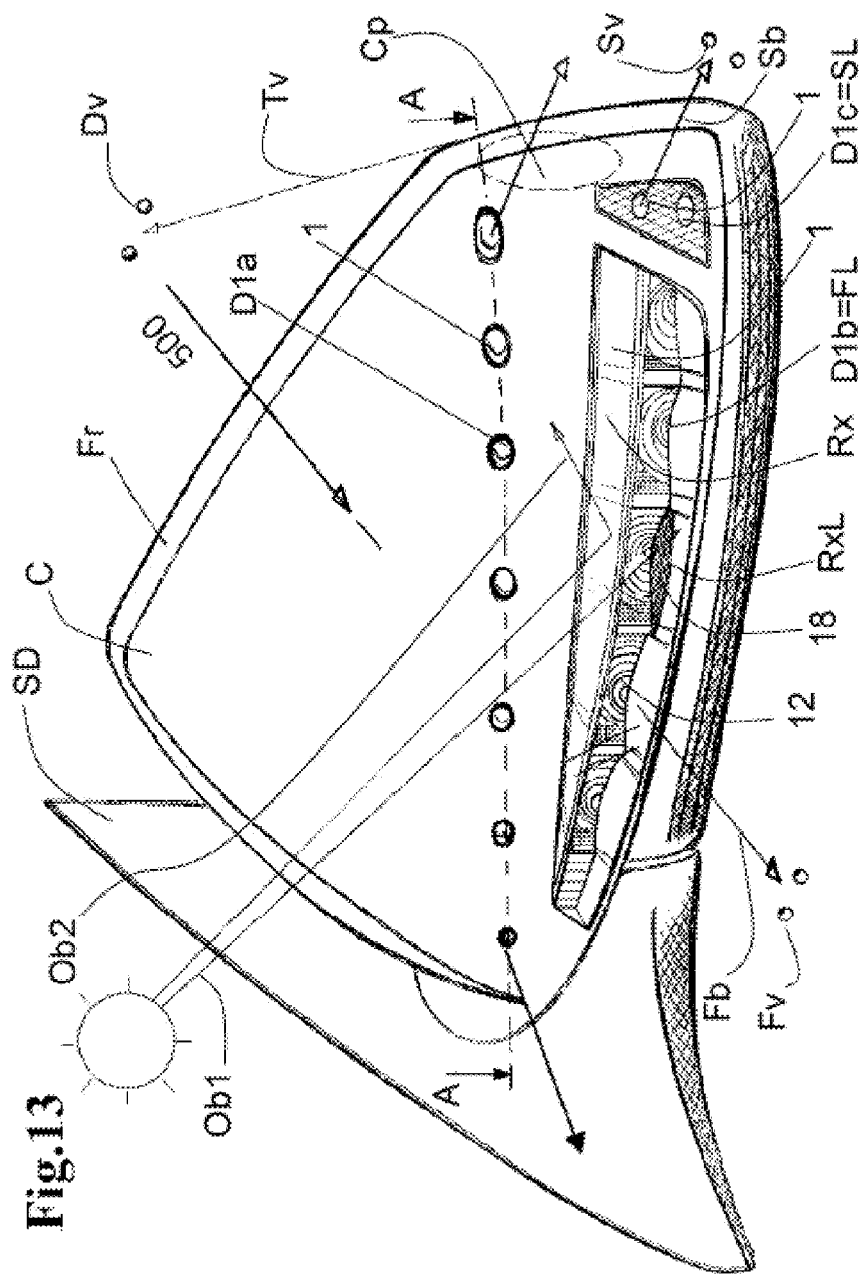
Figure 14:
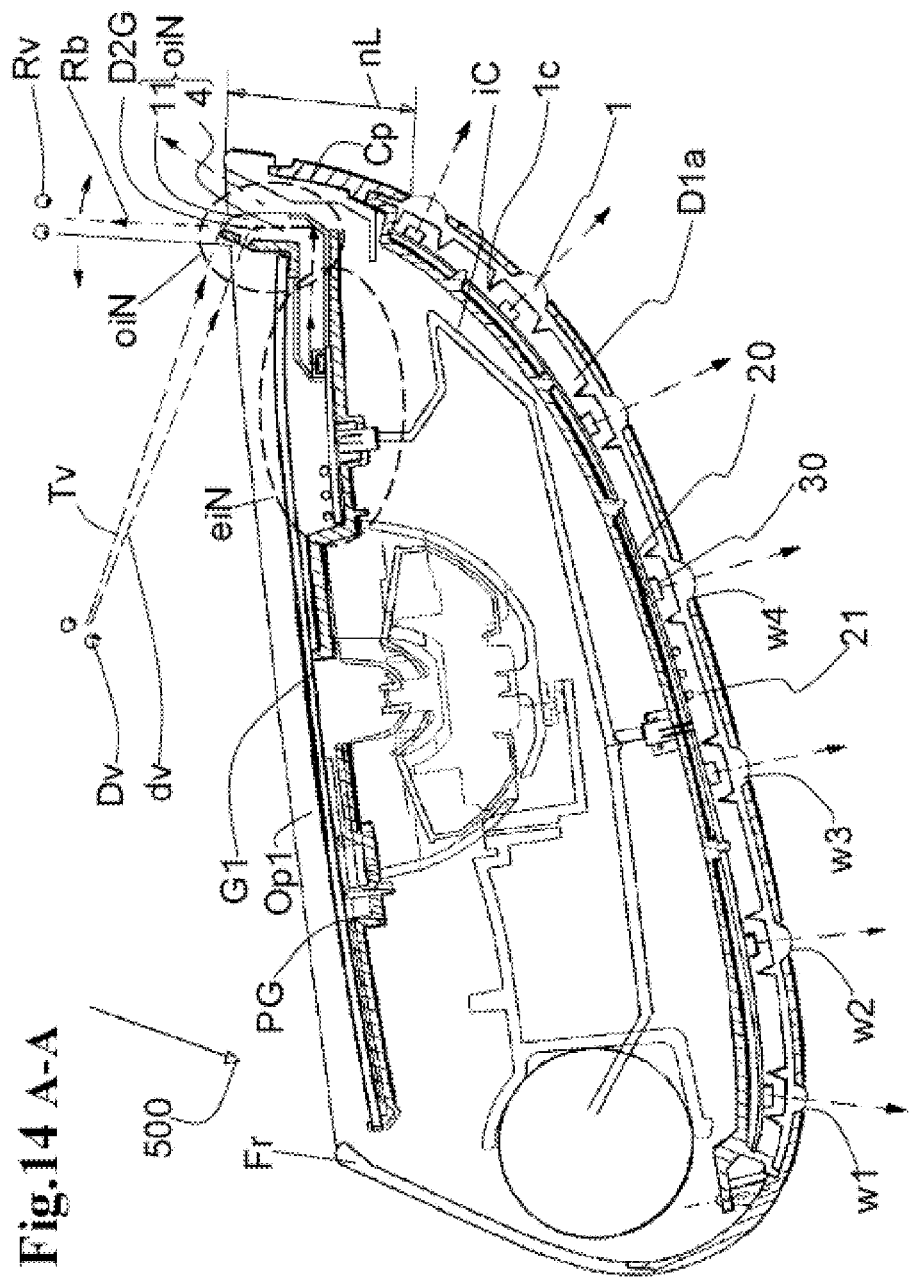
Figure 15:
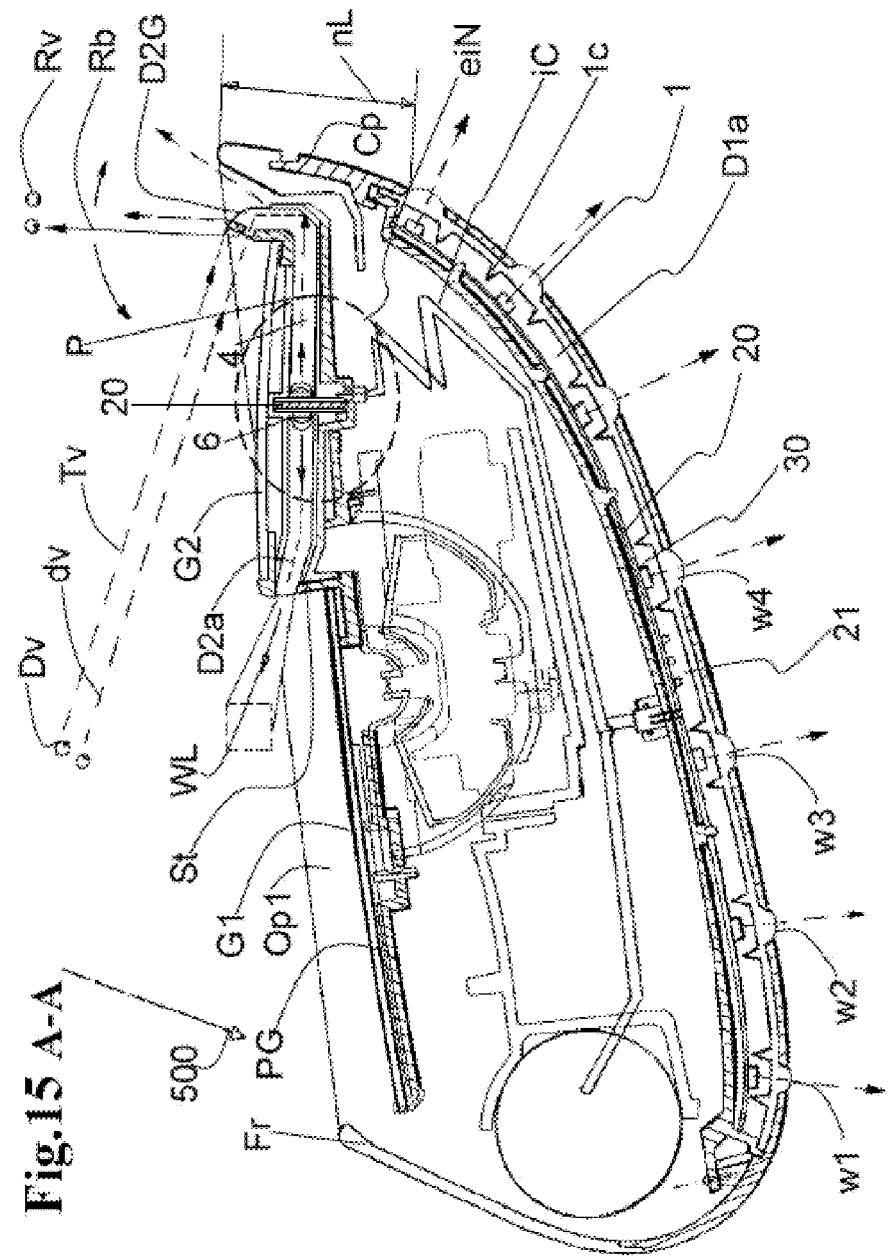
Figure 16:
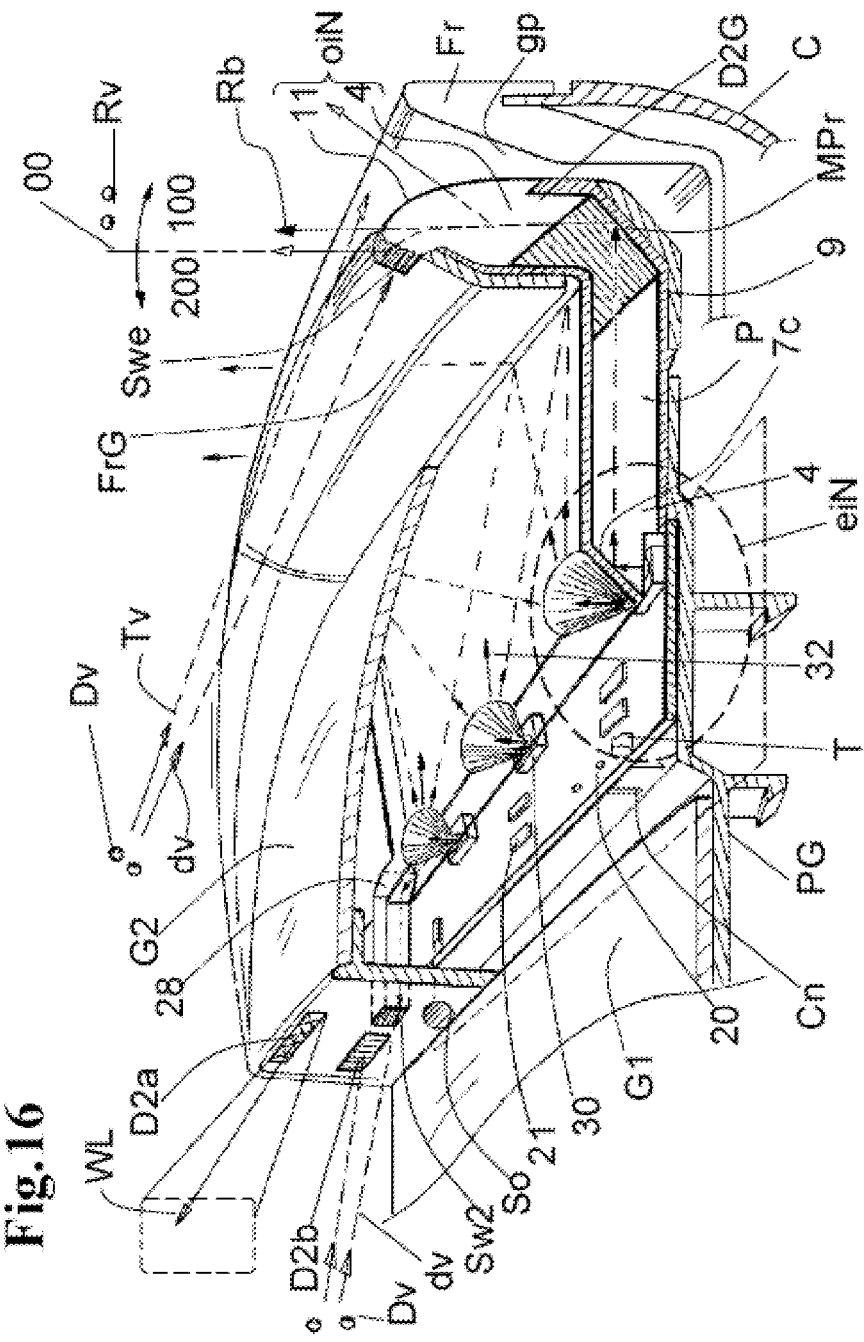
Figure 17:
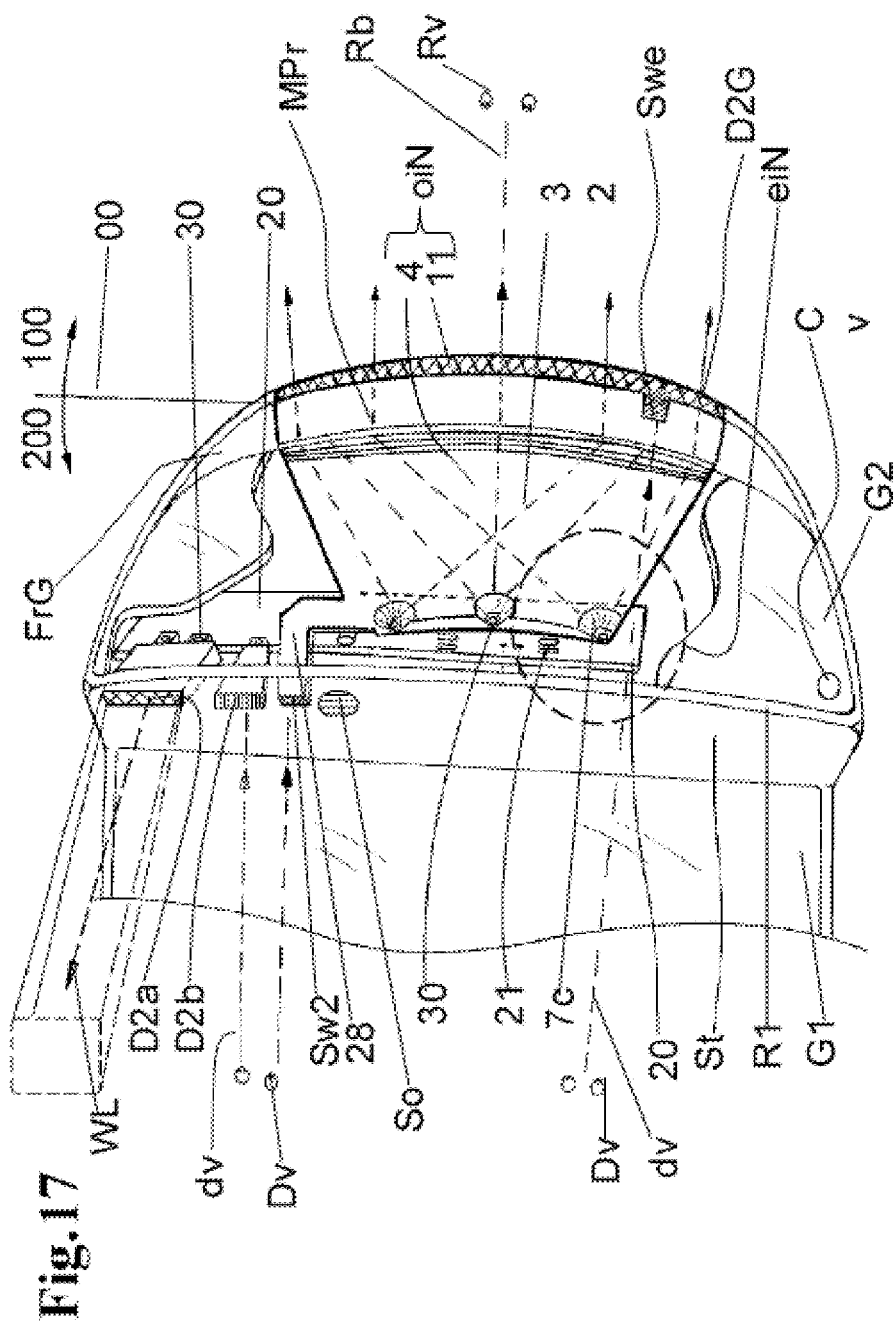
Figure 18:
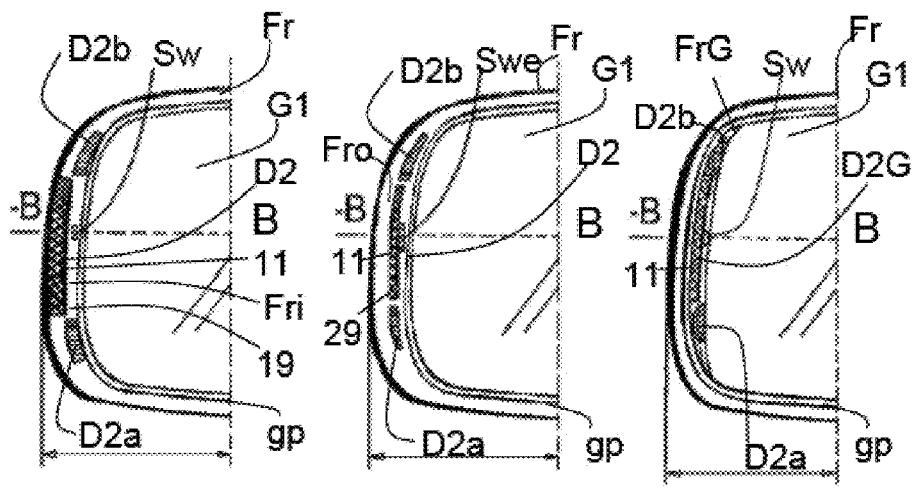
Figure 19:
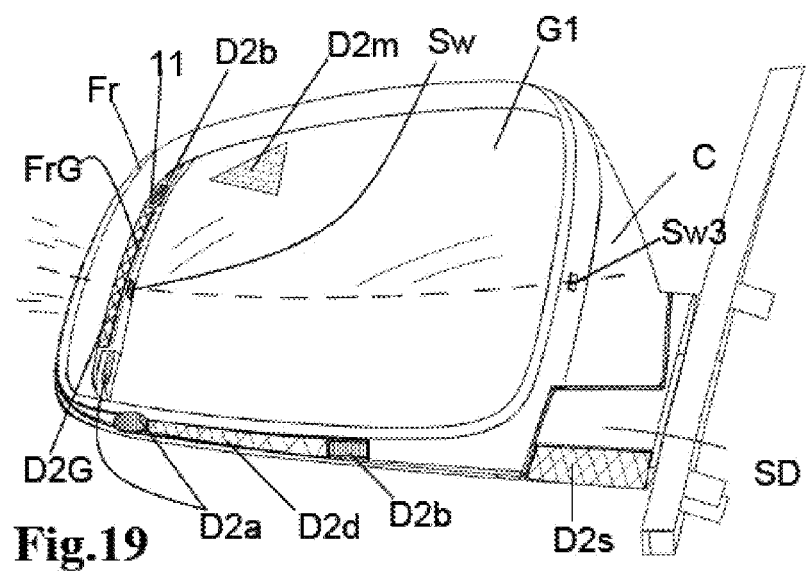
Figure 20:
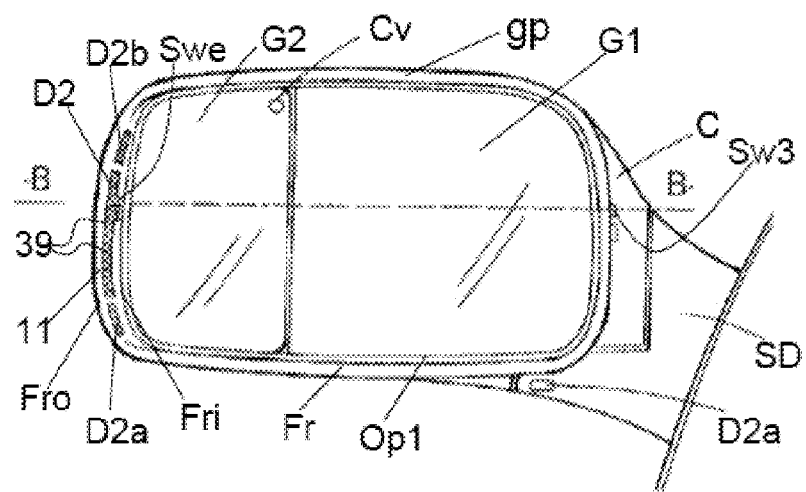
Figure 21:
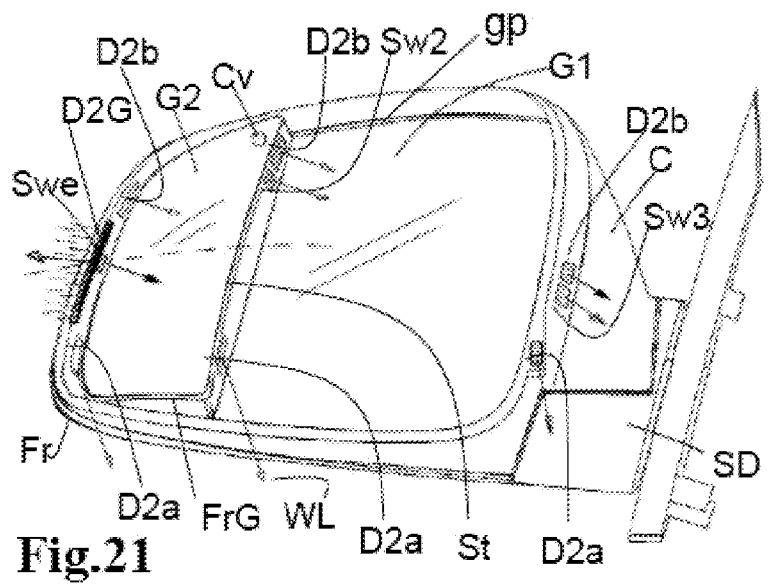
Figure 22:
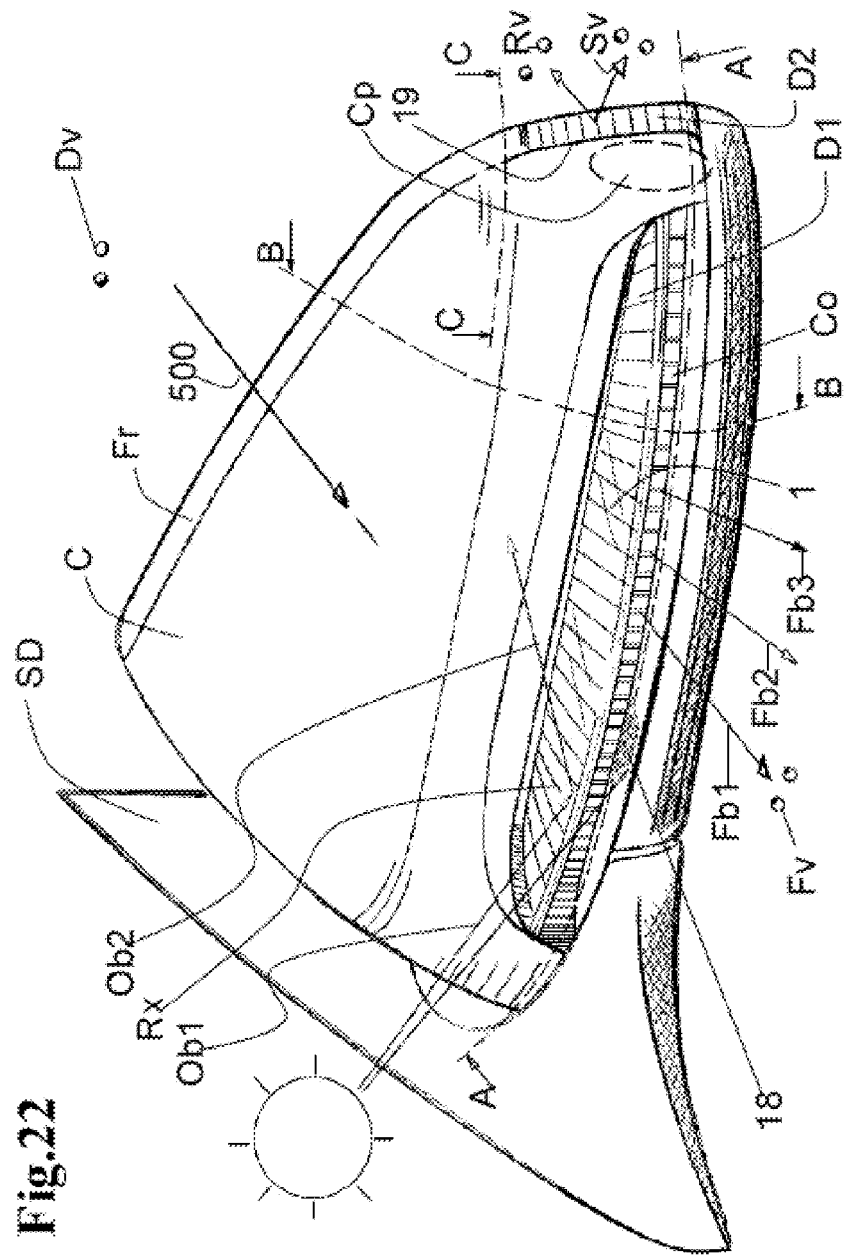

an electro-optical interface eiN formed by a complex optical body 4, a prismatic mirror 7 for coupling the light of its LEDs 30.

a means of protecting against the incidence of outdoor light Ob1 on said LEDs 30 by an opaque outer structural cover Cp.

a member 8 which takes up said signal test window Sw on the inner part of said frame Fri using the same light source as said turn signal.

an optical interface oiN formed by the optical body 4, inner reflective surfaces 9 and the outer transparent surface 11 for decoupling the light. It can be observed that said module D2 is assembled after the outer recess 19, therefore the inner part of the frame Fri is visible to the driver Dv, FIG. 9 is a detail of a section B-B as in FIG. 8 on a variant of the module towards the rear D2 with the difference that its electro-optical interface eiN has, for coupling the light of its LEDs, a complex optical body 4 with optical devices 6 for the inlet of light, and the protection against the outer incident light Ob1 on said LEDs 30 is an opaque part of the inner body 10 or interface of the front module D1;

FIG. 10 is a detail of a cross-section taken along line B-B of a figure similar to FIG. 7 but on a variant of the module towards the rear D2 inserted from the inner recess 29, in the area directly visible to the driver Dv, therefore its outer part is the outer part of said frame Fro and the inner opaque part, which takes up said recess 29 and separates it from the vision of the driver Dv is part of the supporting body 10 of the same module D2. Intermediate prismatic optical devices Opr are observed in the front module D1 between the LEDs 30 and the transparent cover 1 producing a large light distribution;

FIG. 11 is a graph that represents on the coordinate axis "Y" the light emission intensity for continuous ignition signals FL, SL and WL, and in the axis "X" on-off frequency that produces a controller circuit acting with current pulses between zero and one on said LEDs at a rate such that the human eye perceives light emitted frequency such as continuous ignition;

FIG. 12 is a detail of a cross-section view taken along line B-B of a figure similar to FIG. 7 on a variant of the module towards the rear D2 which abuts with a part of the frame Fr or the perimeter of the casing C, said abutting area is a surface 49 designed and suitable so that the module is perfectly coupled to the frame, therefore said module D2 forms a supplementary frame portion, and the opaque part of said outer and inner module is part of its interface or supporting body 10;

FIG. 13 is a front perspective view of a multisignal rear-view mirror assembly the front emissions of which are formed by signal modules or devices D1a, D1b and D1c with their cavities and light outlet windows all separated from one another;

FIG. 14 is a cross-section view taken along line A-A of FIG. 13 on a front signal D1a emitted through separated windows (W1, W2, W3, . . . ) and the associated module D2 for emitting the same signal but visible from the rear Rv, it is located in the plate glass holding plate assembly. It can be observed in detail that the electro-optical interface eiN is under the plate glass G1;

FIG. 15 is a cross-section view taken along lines A-A of FIG. 11 for one embodiment with the plate glass holding plate assembly divided into two plate glasses, with the outlet of a light D2a directed towards the door by means of the beam WL from the unevenness St between said two plate glasses G1 and G2;

FIG. 16 is a detailed partially sectioned and partly transparent perspective view of a detail of a plate glass holding plate assembly having the electro-optical interface eiN formed by a complex optical body 4, the light source with its LEDs 30 and circuit 20 is partly under the plate glass G2; and the optical interface oiN formed by a part of said optical body 4 and the transparent surface for emitting and decoupling the light 11 is between the plate glass G2 and the structural frame Fr. It is observed in this embodiment that the small window which emits an operating indicator light, using the same light of the blinking signal, is a small inlet Swe extending from said transparent surface 11; and in the step between both plate glasses G1 and G2 it has a light WL towards the door Da which is emitted by a separate module D2a, a sound outlet So, a test light Sw2 for the blinker deflected from a member 28 of the body 4 of the signal D2, and a second independent test light for the blinker with its own light source D2b which emits light of at least one color as a complement of a detection system using a camera, radar or peripheral laser scanner of the vehicle;

FIG. 17 is a detailed partially sectioned and partly transparent front perspective view of the plate glass holder plate assembly of the same embodiment as in FIG. 16 with an interface eiN formed by an optical body 4 and a light source 30 under a plate glass. The small window Swe, which emits the operating indicator light of the blinking signal, as an extension of the transparent surface 11; and the plate glasses in two levels forming a step St between G1 and G2 and the light of door WL emitted by the module D2a and the operating indicator light for this variant D2b, included besides D2 in said step, are observed. The complementary plate glass G2 has a camera Cv forming part of the interface of a detection system associated with said test signal D2b, all integrated under the same plate glass G2;

FIG. 18 are respective partial rear views of the end of rear-view mirror assemblies, showing the insertion of the signal module towards the rear D2 with the light towards the door D2a integrated in said module and a transparent cover 11 with respect to the frame casing or plate glass holding plate frame for different embodiments. Specifically:

in FIG. 18a D2 is assembled on an outer recess 19 of the frame-casing Fr.
in FIG. 18b D2 is assembled on an inner recess 29 in the frame-casing Fr.
in FIG. 18c D2 is assembled in the rim or frame-plate glass holding plate FrG;

FIG. 19 is a rear view of a rear-view mirror assembly comprising alternative emitting modules for emitting a signal towards the rear, which can work in association with the first front module, which are: D2m behind the plate glass, D2d in the lower part of the frame, D2s in the support of the rear-view mirror to the bodywork. A light D2a and a test light D2b are observed, which are alternative and independent in the inner frame, lighting up the door as a welcome when getting in the vehicle or as an operating test for peripheral systems;

FIG. 20 is another rear view of a rear-view mirror assembly for another embodiment for which it comprises a module D2 of the turn signal arranged in the central part of the edge of the perimetric frame Fr. It is observed that said surface or outer transparent cover 11 of the module D2 is between the outer part Fro and inner part Fri of said perimetric frame Fr; it furthermore has a light sub-module D2a towards the door, and a test light sub-module D2b indicative of operation, associated with a peripheral detection system, in this case a viewing camera Cv which is in the actual plate glass. Independent alternative positions of said sub-modules D2a, and D2b in the plate glass holding plate or the support SD can be observed;

FIG. 21 is another rear perspective view of a rear-view mirror assembly with a signal module D2 in the rim of a plate glass holding plate assembly, with a step St formed between the plate glasses G1 and G2 with independence from the turn signal and from the light sub-module towards the door D2a, the associated test light sub-module D2b close to the camera Cv forming part of the same interface can be observed, other location variants of said sub-modules in other parts of the rear-view mirror are also observed as an example. For this embodiment in FIGS. 20 and 21 it is observed that the small window Swe which emits the operating indicator light of the blinking signal is a side extension and opening of the transparent surface 11;

FIG. 22 is a front perspective view of a rear-view mirror assembly the front module D1 of which has a reflective cavity based on a collimator Co, with an upper reflective surface Rx for protection against the incidence of outdoor light Ob1 to produce a shadow 18 in said cavity and to deflect or absorb the outdoor light according to the beams Ob2 in order to improve the contrast with daylight;

FIG. 23 is a cross-section view taken along line A-A of FIG. 22, showing a front module D1 having in its cavity a collimator Co as a reflector which is covered and the shadow 18 from the projection of an upper surface Rx represented by a line RxL;

FIG. 24 is a cross-section view taken along line B-B of FIG. 22, showing a vertical lit angle <a formed between the focal axis of the signal towards the front Fb and the outer incident light beam Ob1, the reflector Co being in the shadow 18 and behind said angle <a in said cavity in order to improve the signal emission contrast during the day;

FIG. 25 is a side view of the rear-view mirror of FIG. 22, with partial cross-sections taken along vertical lines D-D of FIGS. 26 and 27, in order to show details of the electro-optical interface eiN (optical devices 4, LEDs 30, circuits 20, light beams) of the devices and functions of the module D2 which are:

D2a constitutes the welcome light using a beam WL oriented towards the door of the vehicle.
D2 constitutes the turn light using a beam Rb oriented towards the rear of the vehicle.
D2b constitutes the auxiliary operating indicator light of peripheral detection systems, and uses a view beam dv viewed directly by the driver;

FIG. 26 is a cross-section view taken along line C-C according to FIGS. 22 and 25 showing a detail of the interface eiN of the part of the multisignal module towards the rear at the level of the cavity D2a producing the welcome light upon emitting a beam WL directed towards the door lighting up an area therein Da, it uses an optical body 4 and LEDs 30 and said lit area is between the vision of the driver Dv and the vision of the rear eye points Rv;

FIG. 27 is a cross-section view taken along line E-E of FIG. 25, showing a detail of the interface eiN of the part of the multisignal module towards the rear at the level of the cavity D2b producing an operating indicator light dv of a peripheral detection or intercommunication system between vehicles, or of a signal, said beam dv is oriented such that it allows a direct view dv towards the eyes of the driver Dv;

FIG. 28 is a perspective view of the side of a vehicle, showing the projections of the beams of the different signals or functions and which points of view the modules comprised in the rear-view mirror assembly proposed by the invention affect. Said figure specifically shows that:

the associated modules D1 and D2 emit a visible turn light towards the front, side and rear, at eye points towards the front Fv, towards the side Sv and the rear Rv.

The module or cavity D2a produces a welcome light by means of a beam WL which lights up an area of the door Da between the eye points of the driver Dv and those from the rear of the vehicle Rv.

Figure 29:
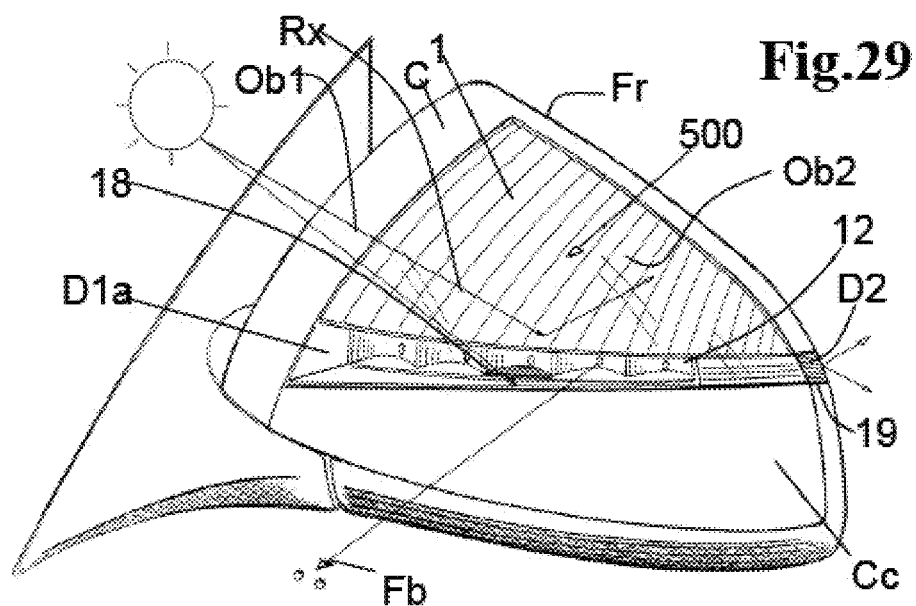
Figure 30:
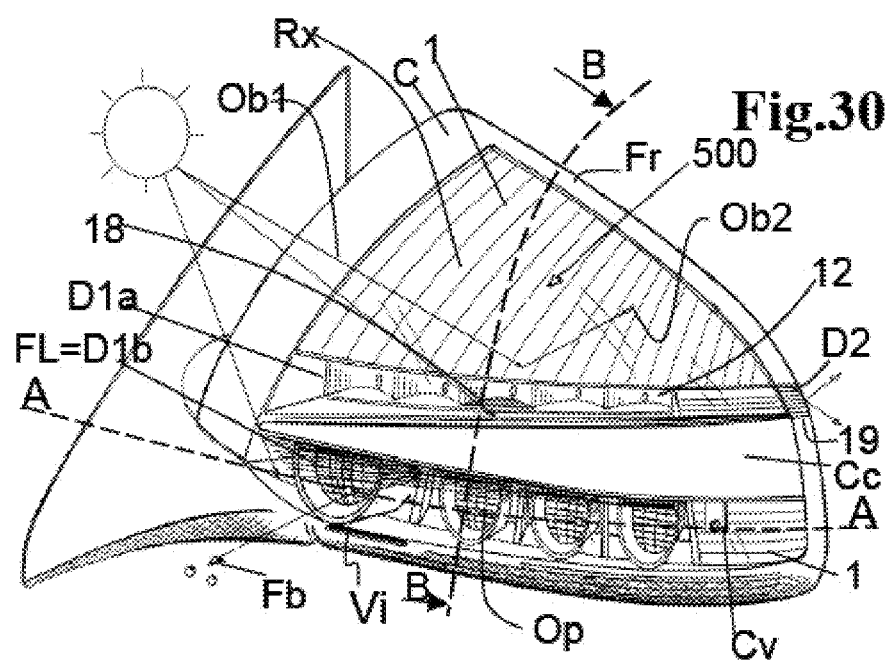

The module or cavity D2b emits an operating indicator light of a peripheral system and uses a direct beam dv of any color, or of a variable color, visible to the eyes of the driver Dv;

FIG. 29 is a front perspective view of a rear-view mirror assembly the front module D1 of which has on its cavity a reflective surface Rx consisting of an inner surface part of the reflector 12 or inner body 10, forming a signal module-cover assembly and has a front protective complementary cover Cc for protection against blows;

FIG. 30 is another front perspective view of a rear-view mirror assembly similar to that of FIG. 29 but with a complementary cover Cc replacing the former one and it includes an independent module or device D1b for producing a front signal FL; and has a built-in camera Cv.

FIG. 31, section BB of FIG. 30, shows said device D1b which emits the signal FL positioned in the complementary outer cover Cc which is independent of the device D1a, having:
- A thermal interface tiN provided with elements for removing the heat from its light source through transmission by proximity, complementary holes Vi in the outer cover, Ve1 and Ve2 inside for ventilation by convection and an inner cover acting as a radiator R.
- Intermediate optical devices Op between the transparent cover 1 or 1a and the LED 30.
- A transparent outer cover 1a increasing in volume outwardly with respect to the general level of the casing CL.
- The reflector Rx extending above the electro-optical interface (optical devices Op, reflector 12, parabolas Pb and LEDs 30) as a protection or wing Rx against the incidence of outdoor light Ob1 forming a shadow 18 under and behind Ob1 which improves the contrast of the signal during the day.
- Individual parabolas or paraboloidal cavities Pb for each LED 30.
- A projection Cp or protection for the outer cover or casing protruding in front of its transparent cover 1a as protection against blows.

FIG. 32, section AA of FIG. 30, shows the elements described in FIG. 31 and particularly that the device D1b producing the front signal FL has individual parabolas or reflective cavities Pb for each emitter 30 with at least two of its respective focal axes parallel Fb1, Fb; and that said emitters (LEDs or LED chips inserted directly in the PCB circuit 20) are arranged in parallel planes (y1, y2, y3, y4) either in a flexible circuit 20F or in associated and interconnected supporting boards. See the detail of the transparent cover 1a in front of the line of the rear-view mirror CL for increasing volume towards the exterior of the rear-view mirror assembly, and the detail of the reflector Rx producing the shadow 18 for the emitters 30, optical devices Op and also the camera Cv.

FIG. 33 is a front perspective view of a rear-view mirror with two interchangeable, interconnected blinker devices D1a and D2.

FIG. 34 is similar to FIG. 33, but with a complementary cover replacing the former one and it includes a device D1c as a side signal SL.

DETAILED DESCRIPTION OF SEVERAL EMBODIMENTS

To better understand several embodiments, before explaining the operation and constructive features of the signal modules, locaters, or operating indicators or welcome light used, reference is made to:

1.0. Points of view surrounding the signals, areas of light and shadow, directions, angles and emission patterns, main beams and axes of reference of the vehicle.

2.0—Signal modules of the rear-view mirror, features, and extension of transparent surfaces or windows.

2.1.—Types of signals. Location, cavities, separations, insertion, fixing, independent modules, integration of signals in a module, integration of signals in structural parts of the rear-view mirror.

3.0.—Protection of the signal modules against blows.

3.1.—Protection against the incidence of outdoor light during the day. Contrast.

3.2.—Protection against overheating. Cooling.

4.0.—Locaters, operating indicators, acoustics, sensors.

4.1.—Cameras, intrusion detectors, sensors.

DEFINITIONS 1.0.—The Multisignal Rear-View Mirror Assembly has (see FIGS. 1, 2, 4 and 28):

A position projecting on the side with respect to the bodywork of the vehicle Car which allows projecting a horizontal light area 100 towards the exterior side of the bodywork, limited by a line 00 with respect to a shadow area 200 towards the interior of the bodywork; inside said light area 100 the following points of view of reference and towards the front Fv, side Sv, and rear Rv are visible; and a point of view of the driver Dv which is inside said shadow area 200, from which there is perceived a tangential vision Tv of the light outlet of the second signal module D2 which emits towards the rear and/or a direct view dv of a operating indicator signal of the turn signal produced by said second module D2 through a small window Sw located in the inner part Fri of said frame-casing Fr, or there is perceived a cavity or sub-module D2b producing an operating indicator signal independent from the source of said turn signal.

an axis 500 of circulation of the vehicle, an axis 501 passing through the front module and parallel to the axis of circulation, an axis 502 passing through the signal module towards the rear D2 and is parallel to the axis of travel but in the opposite direction, an axis 503 perpendicular to the axis of travel and passing through the rear-view mirror assembly in the cavity producing the side signal SL and, an extreme tangential line XL parallel to the axis of travel and defining the end of the vehicle receiving blows, scrapes and scratches.

The directions and angles of emission of the signals according to their main beams are:

Fb: direction of front emission "front beam" towards the eye points Fv parallel to the axis 500 of the vehicle.

Sb: direction of side emission "side beam" towards the eye points Sv perpendicular to the axis 500 of the vehicle.

Rb: direction of rear emission "rear beam" towards the eye points Rv parallel to the axis 500 of the vehicle but in the opposite direction.

102: angle of horizontal emission of the module D2 towards the rear from the axis 502 with an outwardly lit pattern of at least 55°.

102F: angle of signal to the front and side of the front signal module D1 which, together with 102, emits the turn signal in three directions, i.e., towards the front, the side and the rear.

101: angle of signal towards the front FL with a lit pattern greater than 20° in the horizontal on each side of its focal axis and corresponding to the locating signal of a fixed daytime and nighttime light of the module or cavity D1b the focal axis of which is 501.

103: angle of side signal SL with a lit pattern greater than 15° in the horizontal on each side of its focal axis corresponding to the locating signal from the side with a fixed nighttime light of the module or cavity D1c the focal axis of which is 503 perpendicular to the axis of the vehicle.

2.0.—These signals are classified in two groups, one towards the front-side emitted by the module D1 or by the sub-modules, devices or cavities D1a, D1b, D1c and another one towards the rear emitted by the module D2, or by the sub-modules, devices or cavities D2, D2G, D2a, D2b; to which there correspond an set of transparent windows in the front of the rear-view mirror Fw or 1, and an set of transparent windows Rw or 11 for signals emitted towards the rear or the door (see FIGS. 2, 4, 5, 11, 18, 24 and 25).

Figure 5:
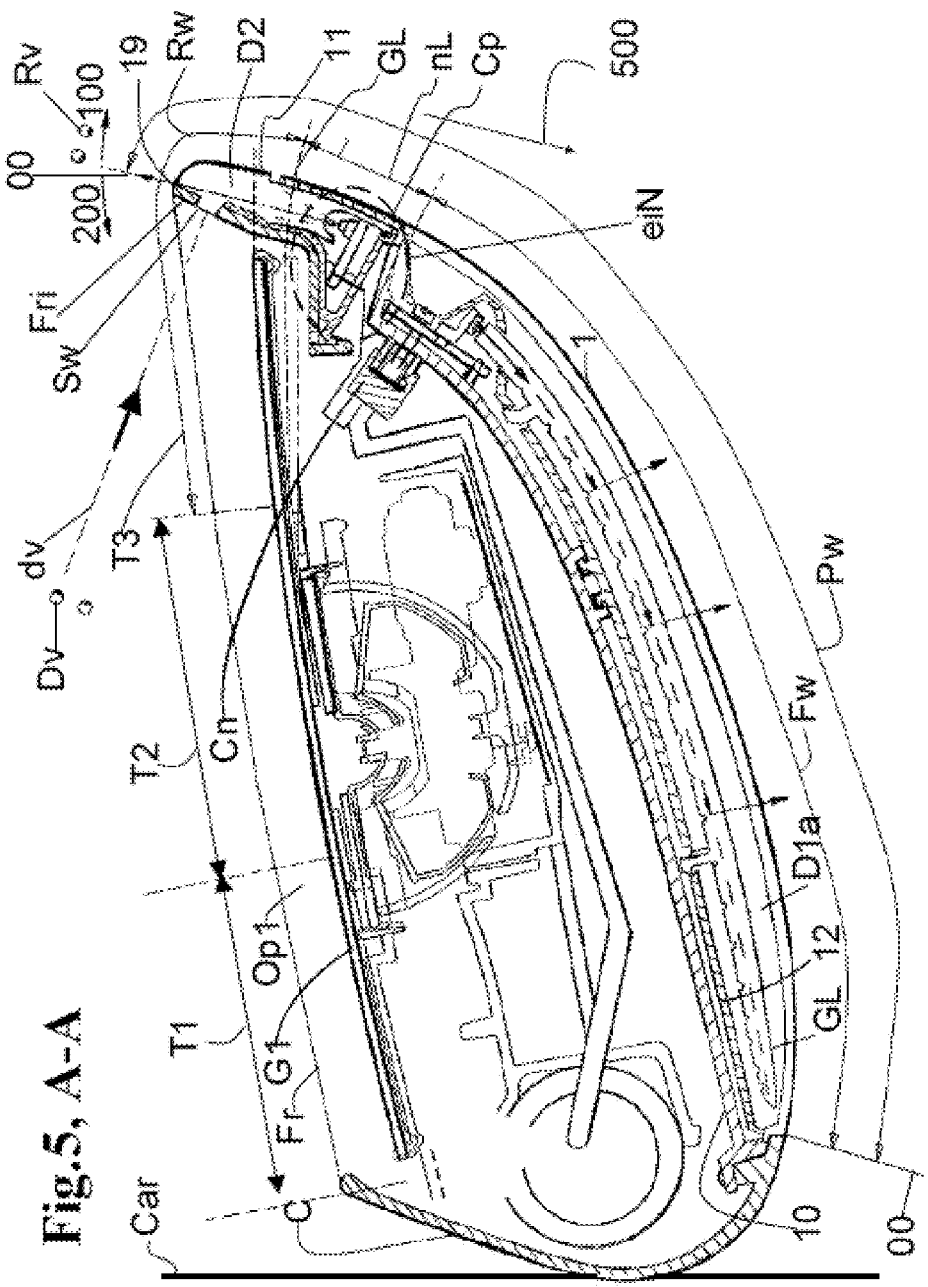
FIG. 5 is a cross-section view taken along line A-A of FIG. 4, on the front modules D1a with a light guide GL associated with the module towards the rear D2 for one and the same signal, and the perimeter of a transparent window Pw of a single emitting module in three directions, i.e., towards the front, the side and the rear, is compared with respect to the front windows Fw of a front module D1 with its outer transparent cover 1, which takes up said second opening Op2 separated by an interpolated opaque area Cp, which does not emit light nL, and a second module D2 with its outer transparent cover 11 which emits the same type of signal towards the rear from the frame Fr of said assembly, visible from the rear point of view Rv of said vehicle. Said part visible from the rear is divided into three thirds T1, T2, T3, where one third T3 is the area farthest from the bodywork Car which preferably includes the second signal module D2.

Said rear-view mirror assembly is divided into three areas or thirds to differentiate its position with respect to the bodywork Car, the first third T1 being considered the closest to said bodywork, and the final third T3 the farthest from the bodywork where the transparent windows Rw or 11 of the modules D2, D2G are normally located in a portion of the structural part which is the perimetric frame Fr and from where the signals are emitted towards the rear (see FIG. 5).

In said rear-view mirror assembly, said first front light module D1 is an integrated multisignal module having independent inner cavities for housing, in addition to a first light device D1a for emitting said turn signal, at least one second light device D1b and/or third light device D1c.

2.1.—Therefore in the Front Multisignal Module D1 in which the Cavities D1a, D1b, D1c are Grouped:

D1a: is a sub-module, cavity or device for the turn signal towards the front-side.

FL: is a locating signal produced by a light device suitable for emitting a fixed white light locating light signal towards the front (FL) which operates simultaneously with another similar signal emitted from a rear-view mirror assembly arranged on the other side of the vehicle and is visible at eye points located towards the front (Fv), the focal axis (Fb) of which coincides with the front axis 501, parallel to the axis of travel, it takes up the cavity or sub-module D1b.

SL: is a fixed yellow-orange colored light side locating signal the focal axis Sb of which, where the light intensity is maximum with respect to the rest of the light emitted, uses at least in this focal center 0.6 candelas, coincides with the side axis 503, perpendicular to the axis of travel, takes up the side cavity or sub-module D1c, is emitted together with the rear-view mirror of the other side of the vehicle.

Said signals develop at least one second function for giving an early open door warning when they are interrelated with the activation of the handles of said doors.

For the embodiment in which said multisignal rear-view mirror assembly uses a second light device D1b and/or third light device D1c suitable for emitting said fixed white light locating light signal FL towards the front, the same is suitable for working at two light intensities.

Furthermore, said second light device D1b and/or third light device D1c suitable for emitting the fixed white light locating light signal FL towards the front and/or the fixed yellow light signal SL towards the side uses a controlling circuit which stabilizes the current in each light source by means of digital or analog pulses with a cyclic on and off interval represented by zero and one, with a frequency greater than 20 Hz, such that it is perceived as a light that is switched on continuously for the human eye.

In this last embodiment, said second light device D1b suitable for emitting said fixed white light locating light signal FL towards the front is suitable for emitting said light signal during the day when the vehicle starts and for no longer emitting or reducing its intensity automatically when switching on the general lights L1 of said vehicle.

The signal SL is a locating light for the dark side of the automobile or door area, integrated in other signals of the front module of said rear-view mirror or independent, it uses a yellow light continuously switched on associated with the light of the other side of the vehicle and allows perceiving the vehicle from the side at night and calculating exactly where the door to be located is and perceiving the dimensions of the vehicle on its dark side.

Combined with the front signal FL which emits white light towards the front, they still interact with the stopped vehicle in the event of the door being open, by rotating the position said signal allows knowing the position of said door because the signal which is perceived towards the front becomes the signal that was perceived from the side and is a different color than said first front signal FL.

The angles and direction of emission are: (see FIGS. 2, 4, 6, and 13).

D2: is a multisignal module which emits the turn signal towards the rear, associated with and interconnected to the front module D1, D1a.

For one embodiment, said second light module D2, D2G is also suitable for emitting a second signal which is a light signal WL consisting of a function independent from that of said second turn signal, but integrated in a cavity of said second signal module, said independent function being a lighting function with any light color on an area Da of the bodywork Car on the door of said vehicle and activated before the driver gets in or out of the vehicle automatically, by means of a remote control, or when opening or closing the door.

For another application, D2a is a welcome light sub-module of any light color, even white light, the focal axis WL of which lights up the door of the vehicle Da and is independent of the module D2 which emits towards the rear, or is independent from the same, it is activated with the vehicle stopped when unlocking, automatically when getting in or out or by the remote control and it is progressively switched off after a time interval or when opening or closing the doors.

D2b: operating indicator light sub-module for sensors, peripheral detection or intercommunication systems of the vehicle, has a light source different from the turn signal and emits light of any color visible to the driver of the vehicle, it is integrated in the interface of the signal module towards the rear D2 or is independent but associated therewith.

Figure 4:
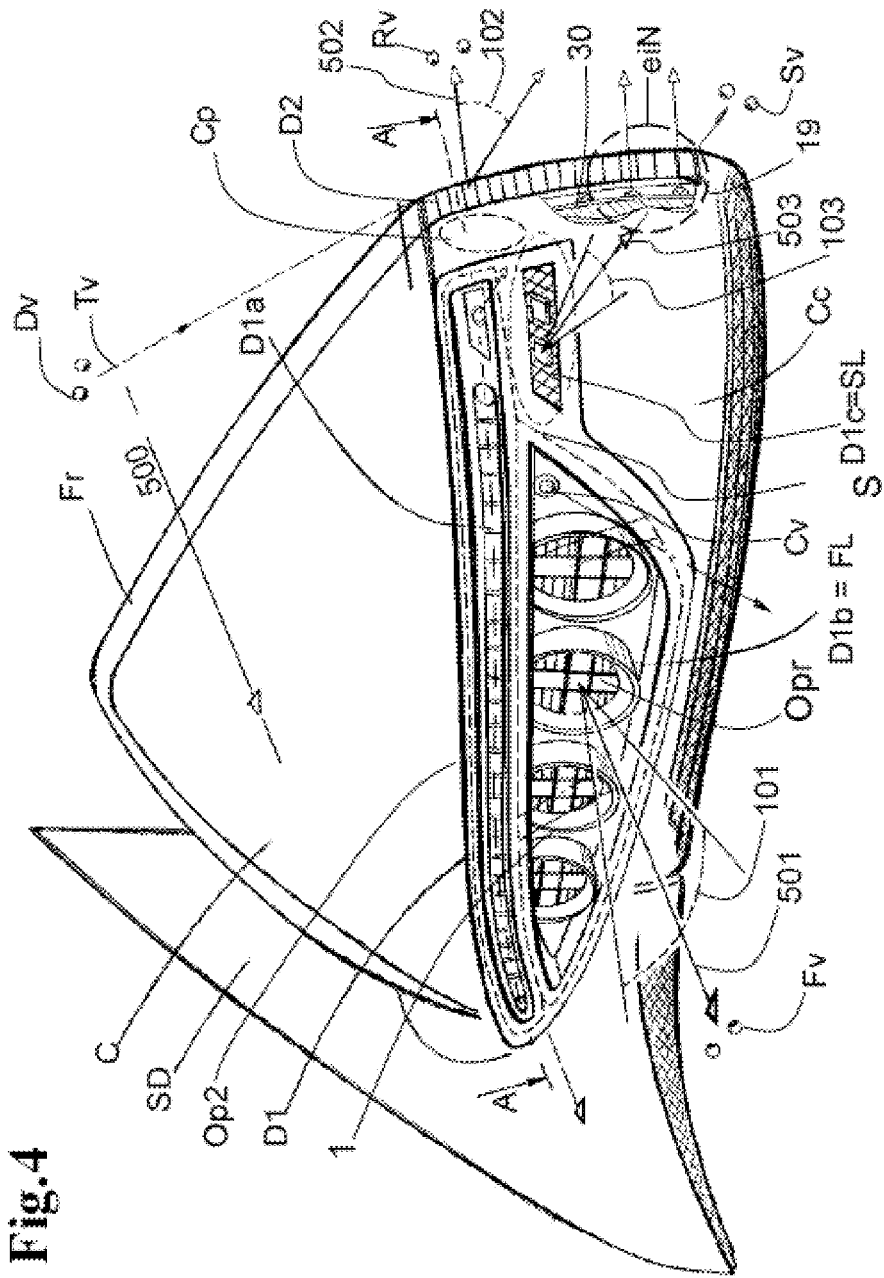
FIG. 4 is a front perspective view of a multisignal rear-view mirror assembly with a front module D1 showing a dotted line on separating surfaces S of cavities of different functions, devices or modules D1a, D1b, D1c; it shows in transparency a detail of the electro-optical interface eiN, (LEDs 30, circuits 20) of a module towards the rear D2, and it shows an opaque area Cp, interpolated between the modules as a protection against outdoor light and blows; and the light emission axes towards the front 501 parallel to the axis of travel, to the side 503 perpendicular to said axis and towards the rear 502 parallel to the axis of travel but in the opposite direction.

When said cavities of the front module are integrated under one and the same transparent cover 1, they have a part of the inner body 10 or reflector 12 which, due to its design, approaches said transparent cover forming a surface S parallel to said transparent cover the function of which is to establish a separation between said cavities or functions, and is graphically represented with a dotted line according to FIGS. 4 and 7.

For one application, said cavities of the front module are modules separated from one another D1a, D1b, D1c. These signal modules separated and independent from one another or associated in pairs, for example D1a+D1b or D1a+D1c, D1b+D1c, can in turn have a configuration for their outer transparent cover 1 which is partly concealed by the casing cover C, Cc, it thus comprises a plurality of openings W1, W2, W3, W4 . . . Wn defined in said outer wall of said casing of said rear-view mirror assembly, located in said area opposite said main plate glass G1, and because after each opening of said plurality of openings there is arranged at least one of said cavities, each of said openings W1, W2, W3, W4 . . . Wn being closed by an outer transparent or translucent cover 1 and it is possible to apply this configuration for one and the same function or for each function.

For one embodiment, in said multisignal modules D1, D2, D2G, D2a, D2b the transparent cover is unified or extends behind a structural part of the casing or the frame which does not transmit light, at least one of said transparent or translucent covers 1, 11 is integrated in the casing C, Cc of the rear-view mirror assembly, or in said structural part forming a perimetric frame Fr or in a portion thereof, or in said adjacent part of the rear-view mirror assembly, through a bi-material injection process, it can thus have more than one light outlet window for one and the same type of signal; said bi-material injection process and is a consequence of sharing a mold, where one material is the transparent material, in said case of bi-material injection the opaque part or casing C, Cc is not painted.

For another embodiment, if said transparent cover 1 which is W1, W2, W3, W4, or the outer transparent cover of the second module D2 which is 11 is assembled or if one part is integrated in the other, which is the casing cover C, Cc, mechanically by assembly, the opaque part, casing or cover C, Cc or the frame Fr, can be painted (see FIGS. 13, 14, 15, 32).

When said multiple windows are small forms, they have a crown-type extension of the transparent cover 1c towards the inside for the purpose of preventing the leaking out of light through its inner sides. FIGS. 14 and 15.

For another embodiment, said structural opaque part surrounding the transparent windows of said signal modules or devices can be painted or can have a surface treatment, such as for example anodizing if they are of aluminum or an overlay adhered and varnished, as a decorative cover (see FIGS. 13, 14 and 15).

3.0.—Protection with Structural Parts of the Signal Modules Against Blows.

The second module D2 associated with and interconnected to the first module D1 is an independent multisignal module which performs at least the turn signal but towards the rear, it is integrated, housed, inserted in or abutting with the perimetric frame Fr of said rear-view mirror, normally without projecting therefrom and its electro-optical interface eiN is concealed by a structural opaque part of the casing cover C, Cc referred to as protective cover Cp which normally takes up the third or area T3 farthest from the bodywork and comprises at least one of the following structural elements, or a combination thereof or other structural parts, at least one casing cover C and one or more half-casings Cc, or a part of the inner supporting body of said module 10, or of its reflector 12.

Said opaque part is interpolated between the first module D1 and said second module D2 separating them.

For one embodiment, the second opening Op2 extends towards the rear until intersecting with the structural frame Fr, thus establishing contact between the transparent surfaces 1, 11 of said first and second light modules D1, D2, said modules are then arranged one after the other, establishing contact at least between their outer transparent or translucent covers 1, 11, or between any of their inner parts 12, 10 and any of said outer transparent covers 1, 11 which are located one after the other, in this case said opaque part Cp concealed by part of the interface eiN is part of one of the signal modules and is immediately under the transparent surface. Interaction of the locating signals:

Said outer covers, parts of the casing or half-casings or additional covers C, Cc are ex professo suitable for receiving tangential blows in their extreme area XL on the side far from the bodywork of the vehicle Cp, therefore their composition is in a material suitable for receiving blows such as fibers, plastics with additives, elastomers or metal, especially of the treated or anodized aluminum type (see FIGS. 4, 5, 6, 7, 8, 9, 10, 11 and 12).

3.1.—Protection Against the Incidence of Outdoor Light During the Day (Contrast).

Said protective cover for protection against blows Cp also protects the interface eiN of the emitters or reflectors of the second signal emission module D2 from the incidence of the beams of outdoor light during the day producing an area which does not emit light n1 which in turn improves the perception of light towards the rear or to the eyes of the driver in the case of operating indicator lights, because it products greater light-shadow contrast. FIG. 6 to 12.

For one embodiment, the signals continuously switched on during the day, especially the front signal FL used the front module D1 in its cavity D1b or as independent module D1b makes use of another part of the same front module consisting of a part of the inner interface, part of the reflector 12 or of the inner supporting body 10 prolonging above the reflector until forming a reflective-absorbing surface Rx for reflecting-absorbing the incident outdoor light Ob1 almost parallel to the corresponding outer transparent cover 1, the reflection of this outdoor light produces reflected beams of said outdoor light Ob2 which in turn produces under itself a shadow area 18 on the interface eiN generating the light of the signal along its optical axis Fb or front beam, so better perception of the light emitted during the day with respect to the environmental light is perceived. As a feature, a lit vertical angle a is perceived, formed between the first incident outdoor light beam and the beam of front emission which is in front of said shadow area 18 projected on the emission interface of said signal (see FIGS. 13, 22, 23, 24, 26, 28, 30, 31, 32).

This technique of improving the contrast applies to the other signals of the front module, such as the turn light, blinkers or those of fixed use at night.

3.2.—Protection Against Overheating, Cooling.

For another embodiment, the first light module or front module D1 has locating signals continuously switched on, for example an independent module D1b producing the front locating signal FL or D1c producing the side locating signal SL and the associated sub-module D2a of the welcome light WL using an associated cavity located in the second module D2 or it is an independent module and lights up the door in an area Da for a prolonged time period, normally controlled by a dimmer or timer for the progressive switching on and off.

Functions of this type continuously switched on have a particular treatment of the temperature generated by the LEDs, they develop a thermocouple, with an interface designed for the chain transmission from one material to the other, of the heat of the LEDs of any type and of their protective circuit 21 and supporting circuit 20 even being of metal, using thermal paths 22 between its printed faces 20a and 20b until removing it from the enclosure which houses them, or supporting body 10, and it consists of associating an inner radiator cover R with flaps aR or hollow cooling tubes, which is made of a heat conducting material; composite plastic, or metal, copper, aluminum, or the like, with anti-corrosion process, with a sealing gasket secured to the body of said cavity by screws or clips, as can be seen in FIG. 31.

In order to maintain the heat transmission chain by proximity of the parts and ventilation, the signal modules or devices preferably have a protective circuit 21 which usually has resistors or a microchip for controlling and stabilizing the current which is separated from the circuit of said light source 20, or located outside the module D2, D2G, or in another module, or directly in said PCB 20.

Said light source is integrated by simple or multi-chip LEDs, or the chip on board type, associated with said cover R which in turn interacts with at least one or several ventilation holes Ve1 and Ve2, for circulating the hot air which preferably enters at a lower level and circulates upwards by heating or convection, which produces a renewal thereof and cooling of the signal module. Said holes can have a membrane or reed valve to prevent outside dust, moisture or condensation, and they are designed to prevent water from falling therein (see FIG. 31). Said holes can be associated with an air inlet Vi on the outer cover or any of the casing covers.

4.0.—Locaters, Operating Indicators, Acoustics and Sensors, (see FIGS. 2, 3, 6, 16, 17, 18, 20, 21, 25, 26 and 27).

These elements are associated with outer signals, their function is to indicate, step-by-step, the operating state of said signals or they are a complement of different actions in the process of opening the door when passengers get in and out, or they are a complement of peripheral detection or intercommunication systems, radars, cameras, laser scanners, and are:

Sw: Optical light outlet by means of a small window located in the frame casing Fr or in the part comprising an opaque partition Fri at the height of said recess 19, 29, 39 visible to the eye points of the driver Dv, producing an operating test for said turn signal, derived from said second signal module from the rear D2, ex professo visible to the eyes of the driver Dv, it consists of a transparent light guide type member part 8, 28, attached and associated with the optical body 4, or with the electro-optical interface eiN of said signal D2, D2G, or it is part of said optical body 4, has prisms and inner reflective surfaces and traverses said structural opaque part Fri for the purpose of conducting the light to said light outlet surface Sw or Sw2 which is engraved or has micro-grooves for attenuating the light and producing a diffuse reflection in the direction of the eyes of the driver Dv. Due to its location, it serves for locating the mirror plate glass G1 upon activating the signal. It also projects part of the light which it emits as a signal towards the rear visible to the rear eye points Rv as a complement of the blinking signal emission towards the rear of said vehicle. FIGS. 7 to 21.

Swe: Is an optical outlet variant for another embodiment, said small window Sw, which emits the operating indicator light for the blinking signal, is an inlet Swe with the form of a side extension of the opening containing the transparent surface 11 of said second light emission module towards the rear.

Sw2: Independent or alternative indicator light, it is an optical member on a step or unevenness st formed between said two plate glasses of the plate glass mirror assembly, formed by a member 28 of said optical body 4 or it consists of at least one LED of any color, located in any part of the bodywork, frame of inner door or rear-view mirror acting in association with the signals A and it is visible from the point of view of the driver of the vehicle 202.

D2b is an operating indicator light sub-module for peripheral detection or intercommunication systems or sensors of the vehicle, it has a light source different from that of the turn signal and emits light through a beam dv of any color visible to the eye points Dv corresponding to the driver of the vehicle, it is integrated in the same module and interface or circuit of the signal module towards the rear D2 or it is independent but associated therewith.

So is the outer acoustic signal for improving the warning to the environment, in some applications said operating indicator lights are complemented with acoustic operating indicators, especially in pedestrian areas, in stops or when passengers are getting in and out, said acoustic signal So is under the complementary plate glass G2, it is an element forming part of the circuit of the second signal module or the first signal module.

For another embodiment, the second device D2, or D2G incorporates a temperature sensor T in its interface (see FIG. 16).

4.1.—Cameras, Intrusion Detectors, Sensors. (see FIGS. 4, 5, 16, 17, 20, 21).

The electronic interface eiN or circuits of said associated modules allow integrating intrusion sensors based on video cameras Cv which are oriented towards the rear or the front of the vehicle, and are associated with continuous operating lights such as the front light FL, they have the focal vision towards the front and downwards, said emission and camera can be infrared and in all cases the light—camera association is for facilitating the operation of the latter and for seeing what is happening in the front wheel of the side opposite the driver or the discontinuous line of the road lane. Said cameras are associated with a programmed controller which analyzes the images or with a display for aiding in decision-making.

For another embodiment, said camera Cv is oriented towards the rear, located under the main plate glass G1, or a secondary or abutting plate glass G2, or a portion of the perimetric frame FR; and it shares the electronic interface of the module which emits signals towards the rear D2 or D2G, the plate glass is treated by a laser process which leaves the glass on which the metal coating is deposited free and transparent, thus facilitating the location of a camera under said mirror For another embodiment, the second module D2, or D2G incorporates a temperature sensor T in its interface (see FIG. 16).

Figure 8:
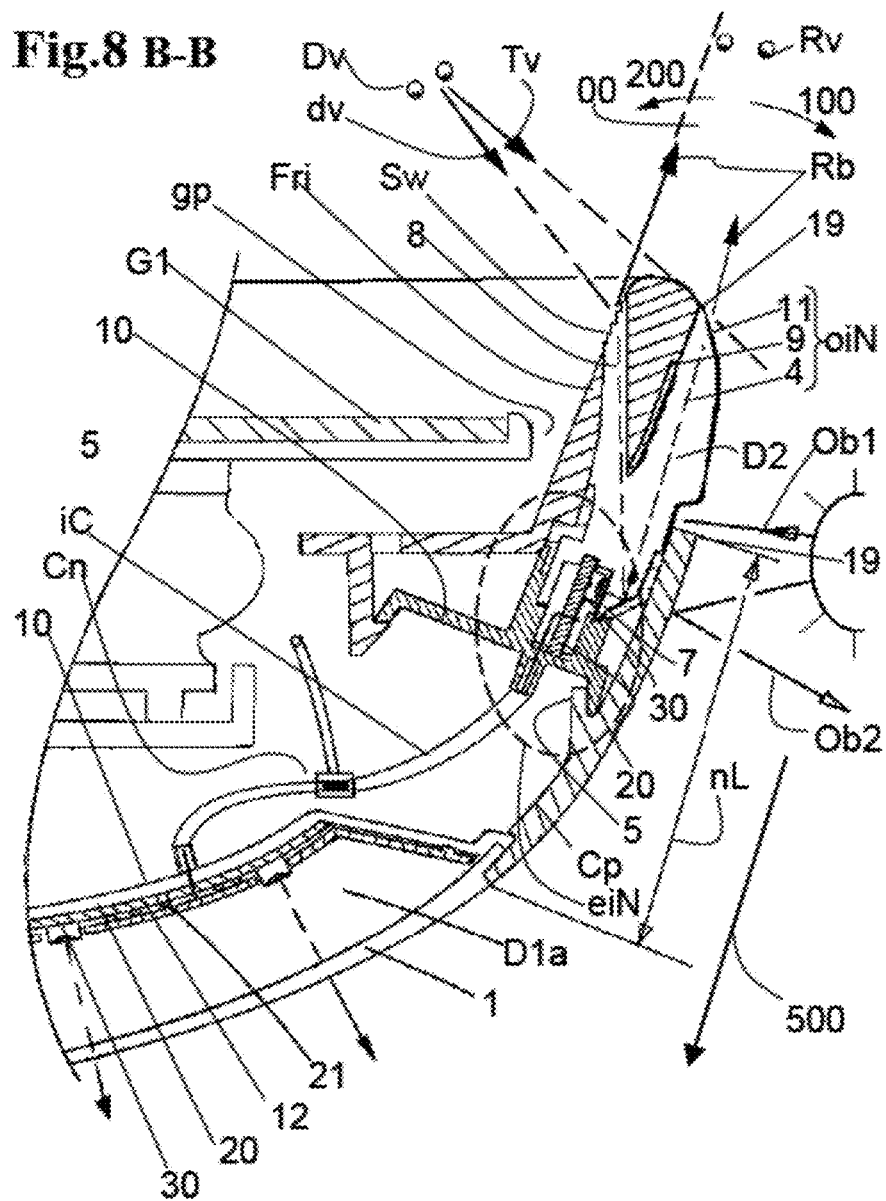
FIG. 8 is a detail of a cross-section taken along line B-B of FIG. 6 on a module towards the rear D2 inserted in the recess 19 of the outer part of the frame Fr, showing.
Figure 9:
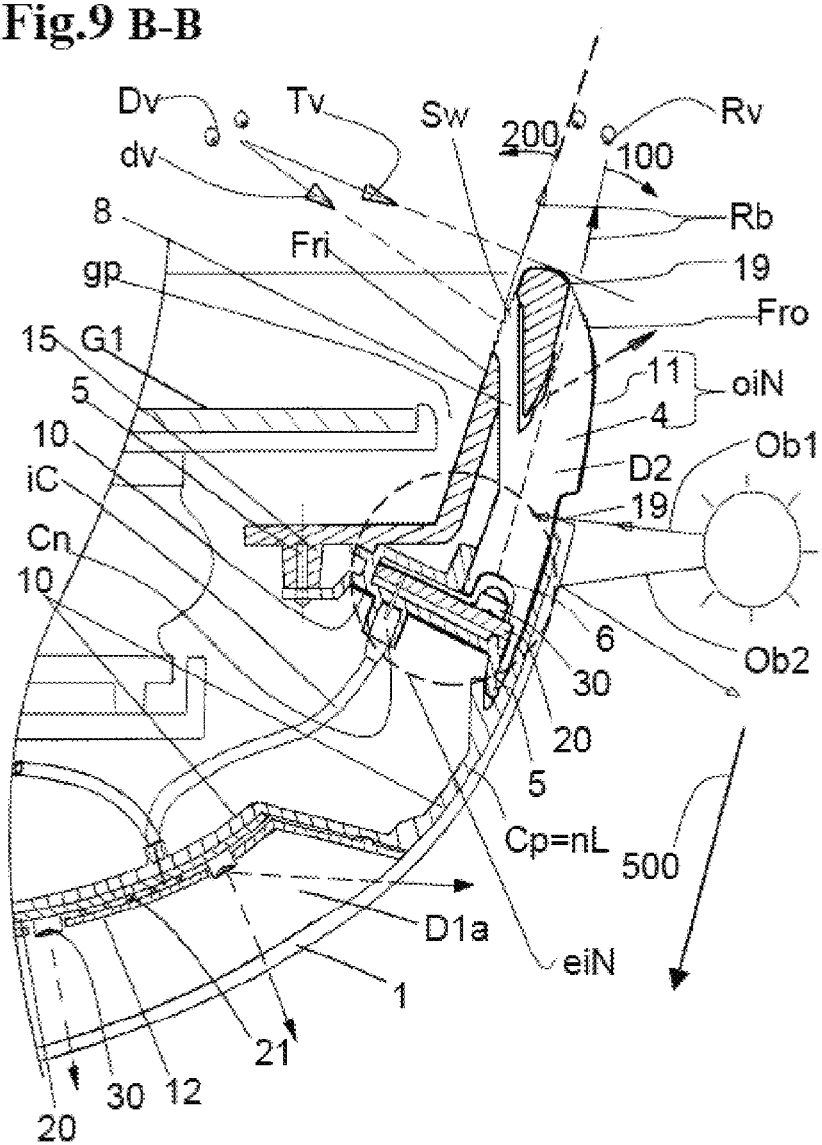

For one embodiment, said second module D2 has in its electro-optical interface eiN a complex optical transparent solid body 4 made up of at least three phases:

1—A light inlet phase with an optical device 6, FIGS. 7, and 9; or with a prismatic micromirror 7 (FIG. 8).

2—A phase of movement of said optical body 4 for inner reflection and homogenization and of the light 9 emitted by the LED 30.

3—An outer optical light outlet surface 11, which is smooth, engraved or with the optical design necessary for the re-direction of the signal towards the rear Rv, and covering the angle of the signal towards the rear 102 FIGS. 1 and 4, maintaining a general outer shape similar to the rest of the frame Fr of said rear-view mirror and it is settled and inserted therein.

This second module D2 has a printed circuit PCB 20 with at least one LED 30 which is located under said casing cover C, Cc which may not have in the same circuit the protective electronic components 21 in order to reduce volume, which are located for this case in the first signal module D1 associated and interconnected by the interconnection cables iC, and it has a supporting body 10 welded or bonded to said optical body 4, protecting the circuit and serving to secure the means for fixing and assembling at least one structural part of said rear-view mirror by clips, teeth or screws 5, 15.

The light inlet or coupling 6 of said complex optical body 4 has a central emission beam Rb of said LED 30 which is parallel to the axis of travel 500 but towards the rear 502 (see FIG. 1). In this case the body 4 has a flat light coupling or an optical control device 6.

In another embodiment, in order to reduce volume the LED 30 uses in the coupling an inclined reflective surface or prismatic micromirror 7 for the light inlet and coupling, close to said LED 30 with an angle of 45° with respect to its main beam; this prismatic mirror 7 reflects said beam towards the direction Rb and homogenizes the light in its reflection such that when seen from Rv, the points of light are not distinguished as separate LEDs in the event of being more than one (see FIG. 8).

The reflective surfaces 9 belong to one and the same part with a vacuum metal coating process, or they consist of a cover, or it is painted with a reflective material applied on the same complex optical body 4.

Said second module between the components of its phases of the complex optical body 4, the light source and the outer transparent surface 11 forms the:

Electro-optical interface eiN formed by the optical devices 6 or prisms 7 of inlet or coupling of the light to the body 4 and the light source, its LEDs 30 and supporting circuits 20.

Optical interface oiN formed by the outer decoupling or light outlet surfaces 11, the inner reflectors 9 and the optical body 4.

Thermal interface tiN formed by components defining a cooling system for the light source.

Said complex optical body 4 has a side member 8 which optically deflects part of the signal light that is visible in an attenuated manner to the driver Dv. Its function is to act as an operating indicator of said turn signal, and as a locater of the rim of the plate glass and it aids when looking towards the rear when activating said system as an early open door warning.

In the surface of said light outlet Sw, Swe, Sw2 or in its course, it has an engraving, a diffuse reflective surface or vertical microgrooves which attenuate the light in direction dv towards the view of the driver Dv, part of this light can be seen from the rear by the eye points Rv and the signal can be partly increased while at the same time continuing to carry out the test function by the driver of said vehicle.

The frame Fr in this area conceals the outlet of the signal 11 at least partly such that the eye points of the driver have a tangential vision Tv of said signal outlet from the rear or they directly do not see it, such that it does not cause any discomfort to look at the plate glass G1 since the focal axis of emission of the signal is towards the rear Rb, towards the points Rv. FIGS. 1 to 12.

For another embodiment, said second module D2 or its electro-optical interface eiN is located under the plate glass G1 or G2 when there is more than one plate glass in the plate glass holding plate assembly PG, with a light outlet visible from the rear Rv located in the outer part of the perimeter of said plate glass holding plate which supports it PG and between said mirror G, or G2 and the frame of the casing Fr, forming the plate glass-signal assembly D2G FIGS. 14 to 17. Said signal module D2G is independent and has slight movement in accordance with the plate glass which holds it with respect to the module D1 fixed to the casing and has an allowance or gap with the frame Fr of said casing.

For one embodiment, D2G comprises a complex optical transparent solid body 4 for distributing the light towards the rear according to the focal axis Rv, its optical interface is divided into 4 technical phases:

1—Inlet phase of the light by means of the inclined prismatic micromirrors 7, conical mirrors 7c, or associated optical devices 6 which in the plane P distribute and homogenize the light beams 32 in a decentralized manner from each emitter 30. Said conical mirrors 7c can be replaced with optical coupling devices 6 such as that of the blinking signal of the second module D2, in this case the circuit 20 and its LEDs are perpendicular to the beam 32 moving across said optical body 4.

2—Phase of the distribution and homogenization plane P of the light 32. Located under the plate glass G or G2 and parallel thereto, it directs the incoming light beams 32 towards an inner prismatic mirror with a light outlet Mpr.

3—Prismatic mirror Mpr is inclined approximately 45° with respect to the distribution and homogenization plane of the light 32, it is smooth, engraved or made up of small reflective facets which redirect the light towards the rear Rv by means of the beams Rb.

4—Outer optical light outlet surface 11, with a smooth surface, engraved surface or with the optical design necessary for redirecting said light towards the rear Rv and for covering the angle 102 (see FIG. 13), with a short course for the light reflected inside said body.

Said complex optical body, at least in the homogenization and reflection phases 2 and 3 of the light, is covered with a reflective surface of a light color, or metal-coated under vacuum, or with reflective paint 9 still applied directly on said body 4, except in the light inlet and outlet parts.

Said signal device D2G has LED emitters 30 on a PCB circuit 20 which can have a protective circuit 21 or said protective circuit can be in the part of the associated front signal emitted by D1 as a novel anti-theft measure of said plate glass—signal assembly. Without that protective circuit D2G does not work.

The entire plate glasses—signal assembly is supported by the plate glass holding structure PG which is in turn secured to the actuator Ac by clips. The rim FrG of said structure PG conceals from the eyes of the driver Dv at least part of the light outlet surface 11 of said signal D2G which have a line of vision Tv tangential to said surface 11, do not see said signal outlet area and are not in the line of the focal axis of emission of signal towards the rear Rv.

Said structure PG in its rim farthest from the bodywork FrG, which is directly visible to the eyes of the driver, conceals the outlet of the signal 11 on one side, on the opposite side it has a small window with attenuated light outlet Sw, directed to the driver Dv as an operating indicator light for said signal or locater of the plate glass and is generated by a transparent member 8 which is part of said optical body 4 or is continuous thereto.

For another embodiment said plate glass holding plate assembly is made up of at least two plate glasses and has as a feature a step or level difference St therebetween (see FIGS. 15 to 17). Said plate glasses G1 and G2 have different inclinations or radii of curvature different from one another can enlarge the field of vision with respect to a single mirror, but furthermore in said step they can have a test light outlet Sw2 by means of the light deflection member 8 provided with reflective and prismatic means for directing the light dv (see FIG. 17) using the same light source which emits the turn light signal in the second light module D2.

The visible outer rim of said structure PG especially in the rim of the step st has a rounding radius greater than 1 mm due to being projecting with respect to the frame of said rear-view mirror Fr in order to not cause accidents when touching them.

Said step has a sound outlet when the module is part of another type of signal such as the early open door warning.

For another embodiment in said step it has an outlet of the welcome light WL oriented towards the bodywork of the vehicle and in this case formed by a module D2a which can be part of the optical body 4 itself or independent of it but associated in the plate glass holding plate assembly PG (see FIGS. 15, 16 and 17).

Said module D2G has a light source formed by a printed circuit PCB 20, horizontal and parallel to the light distribution plane P, with at least one LED 30 located under said cones 7c; or has said PCB 20 perpendicular to said light distribution plane P and couples the light by means of standard light inlet optical devices 6 (see FIGS. 15, 16 and 17).

Said PCB can be made up of a metal plate with the conductive tracks printed in substrates or in a fiberglass or polyester supporting substrate associated with said metal plate, or a circuit 20 printed on both faces 20a, 20b and interconnected by thermal paths, 22 to better dissipate the temperature of the LEDs.

Said plate glass G2, upon being at a more outward level or step than the plate glass G1, has underneath a volume which allows placing a video camera V or infrared IR emitters receivers or a PCB as a radiofrequency antenna associated with a signal amplifier, filter or emitter; the purpose of these elements is to detect the presence or approach close to the vehicle in the direction Rv of vehicles, or intercommunicating therewith, with any type of frequency or encoded language, when opening the door to emit a signal and working as a complement of a door opening or driving maneuver system, giving a sound or visual warning signal, or blocking or delaying the opening of the door by one instant.

Said video camera or sensors work through the plate glasses G1 and G2 which protects them against the elements by a small window which is obtained upon treating said plate glass with laser such that it pulverizes the reflective metal coating thereof at high temperature, as with the protective circuit of the LEDs 21, the electronic interface of said camera, sensor, antenna or part of it is in another part of the rear-view mirror or of the vehicle, preferably in the signal module D1 to prevent the theft of the plate glass holding plate-light signal-sensor assembly, antenna or presence camera. But said sensor system associated with the operating indicator sub-module D2b thereof can also be integrated and share the same interface or electronic circuit 20, 21 forming a single assembly under a plate glass G1, or G2.

The plate glass-mirror assembly consists of a single plate glass G1, or a semi plate glass G2 added, adhered or fixed above the existing one; or a composite plate glass G1+G2+ multisignal module D2G assembly as a replacement of the existing plate glass without signal or its more equipped variants with, furthermore, a presence sensor or camera V, or radio frequency antenna RF.

The antenna located under any of said plate glasses is of the RF condensed type printed on a PCB or the supporting circuit 20 itself of said LEDs printed on the other face and, simultaneously to being an antenna, it acts as a dissipater of the temperature of the LEDs of the signal module; or it is an independent PCB, the function of the antenna for interacting with the operating indicator sub-module D2b allows intercommunicating with other vehicles or emitters—receivers with any type of radiofrequency signal RF which is directed, encoded or with an exchange language of the Wi-Fi type, for example.

Figure 6:
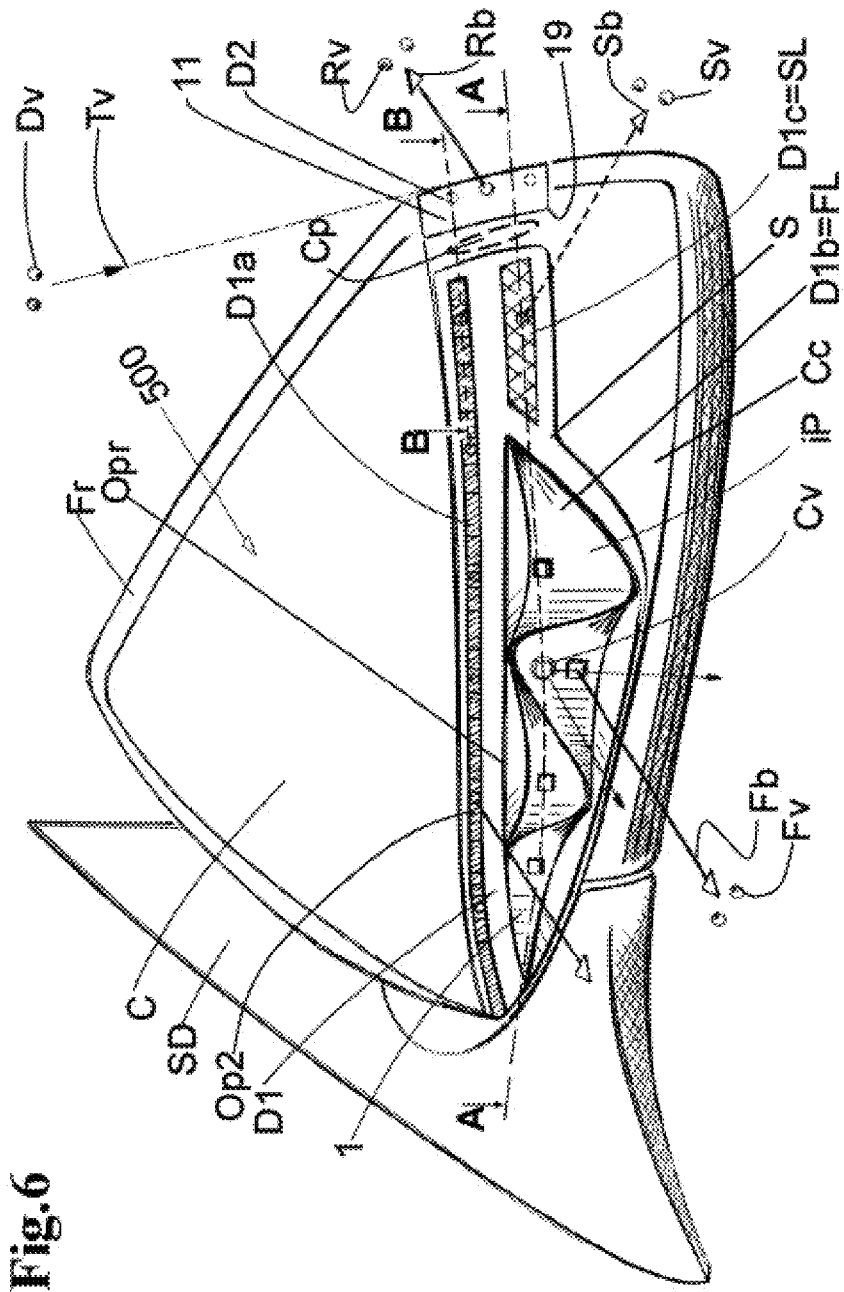
FIG. 6 is a front perspective view of a multisignal rear-view mirror assembly the front module D1 of which uses irregular parabolas iP and a front video camera Cv.

Other references of the rear-view mirror assembly with two associated signal modules D1, D2 are:

An outer transparent cover 1 or 11 of said modules D1 and D2 which, when it is one and the same part for one or more functions, have a surface S or separation sector between the reflectors or cavities 12 or the inner body 10 of the same signal or of different signals formed between the outer transparent surface 1 close and parallel to said surface of the inner part 10 or 12 (see FIGS. 4, 6 and 7).

Rx: It is a surface formed by the association between the transparent surface 1 and part of the reflector 12 when they are close and parallel, the surface formed is a layer-on-layer surface and its appearance given by the inner surfaces is smooth, transparent, engraved or has parallel bands formed by parallel cylindrical sectors or any type of geometric engraving in positive or negative small or bas relief, with inner relief or another type of decorative machining, as an extension of the assembly of signal or it is a separation S or surface between the cavities between equal or different functions which uses the adjacent surface upwardly or under said cavity of signal.

Said surface Rx or S between the light outlets of the different signals as a separator thereof and to prevent the transmittance of light from one signal to another. Thus, the front signal module takes up a large surface on the exterior rear-view mirror assembly similar to a casing cover C, which is not a cover, is a signal module with parts taken up by said surfaces Rx or S which do not emit light, their function is decorative and for the reflection—absorption of the outdoor light Ob1.

As a complement to the fixing, the signal modules D1, D2 have longitudinal ribs 5 at least in one part of the perimeter of the opening comprising said modules, which consists of an extension towards the inside of the casing cover C, or Cc, of at least 1 mm in depth towards the inside of said rear-view mirror assembly, the function thereof is to provide stability, rigidity, facilitate the integration and assembly of a strongly attached cover—signal assembly (see FIGS. 7, 8, 9, 10, 11 and 12).

For the fixing thereof it uses teeth for fixing or positioning the signal, fixing clips for fixing to the casing or for fixing parts of the rear-view mirror structure to one another.

Other references:
15: Fixing screws for fixing to the casing, part of the rear-view mirror structure or assembly or between components inside the module, for example, radiator cover R.

Other forms of stable fixing are by welding, adhesive or gluing.

Figure 3:
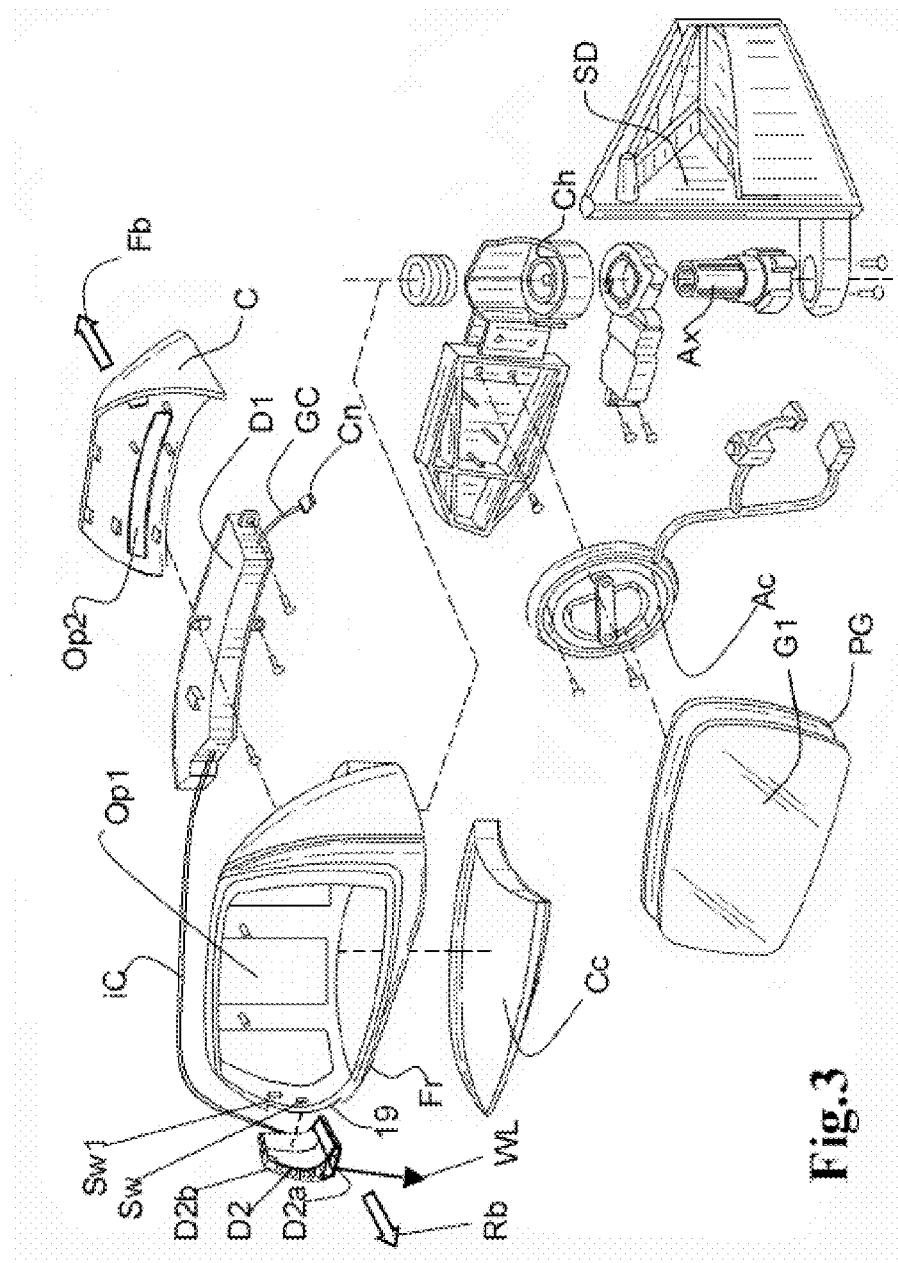
FIG. 3 is an exploded perspective view of a multisignal rear-view mirror assembly showing a front module D1 and a module D2 towards the rear with an outer recess 19 for insertion in the frame Fr, where said module D2 includes an integrated signal D2a which emits the light WL towards the door of the vehicle Da and an integrated signal D2b which is an operating test of peripheral sensor or detection systems or of the vehicle.

The front modules or modules towards the rear in a structural part can abut with one another and integrated such that they become a unit, such as the first module D1+ casing cover or D2+ frame casing, for example (see FIG. 3).

Other references:
(10) Inner body of the signal or support of the interface, which for one embodiment can take up an outer part above the second module (D2), as a protective plate (Cp) for the latter, in the extreme outer area.

12: Interior reflector or interior reflective surfaces, metal-coated or colored, smooth or with facets, such that they form a collimator.

Outer opaque structural parts and complements:
C: Normally painted casing cover which is partly associated with the frame casing D.
Cc: Lower casing cover, or complementary cover which normally takes up the position farthest from the bodywork of said vehicle as a protection against tangential blows coincident with the extreme line XL, made of an extra-hard material or anodized aluminum (see FIGS. 4, 6, 23, 22, 28, 32, 33 and 34).

Said cover or cover portion, when it is an outer opaque structural part of the casing cover C, Cc separating the multisignal modules D1 and D2, produces an area which does not emit light nL on the side, and said opaque area furthermore has a safety purpose since it is anti-blows and prevents failure due to breakage.

For another embodiment, since said modules are modules associated with one of said covers and are integrated as a cover—signal assembly, they form a replacement "kit" assembly with more or less functions or a different design.

A rear-view mirror with a simple plate glass G1 can receive as a spare part an additional plate glass of the type of G1+G2+signal D2G with the sub-modules of the welcome light D2a and the operating test D2b which interacts with said camera+the video camera+the antenna RF sharing the same electronic base.

A plate glass G1 of a rear-view mirror can receive an additional supplementary plate glass G2+signal D2 which can abut with said plate glass G1 and connect said signal to a standard front signal D1 of the rear-view mirror, or receive a new plate glass G1+the module D2G (FIGS. 14, 15, 16 and 17).

Other references:
SD Support of said rear-view mirror to the door, fairing or bodywork of the vehicle.
G1: Rear-view element, mirror or plate glass when it is only one.
G1 and G2 Assembly: Rear-view element, mirror or plate glass in two levels with different inclination and level between said plate glasses forming a step St between said two parts, the option of being a supplementary plate glass G2 can be abutted on the first G1 acting as a base or is so formed by a plate glass holding plate PG which allows said level differences St.
Ac: Actuator or mechanism for positioning the plate glass G1.
iC: Electric cable for interconnection to the general electric circuit or to the controller which provides the functions or between said modules which passes to the door or bodywork of the vehicle. Normally, one of said signal modules, preferably the front one
Cn: connector which is part of the inner body 10 of the signal module, it is such that two parts are connected to one another in an aerial manner although they can later be fixed to a structural part of said rear-view mirror.
D1 is provided with a protective circuit 21 which electronically protects the second module as well, especially when it is integrated in the plate glass G1 and, since it essential for operating, it produces an anti-theft measure, since said plate glass+the module D2 without said protective circuit does not work.

The different signal modules can combine and integrate more than one technique for producing light such as electroluminescent substrates referred to as OLEDS, comprising at least one electroluminescent substrate between two conductive substrates positive and negative and, in order to improve the contrast, it includes a dark or black non-luminescent substrate delimiting or separating the light areas produced by said electroluminescent substrate; they are used for the front part D1 for the turn signal complementarily with the second module towards the rear D2, or D2G the source of which is LEDs.

Other References:
30: The light emitter LEDs of any type, forming the base of light emitters of said signals for all devices, with a configuration of the type of a single chip per capsule or multichip of more than one chip per capsule, or chips applied on a "chip on board" metal plate or with optical devices abutting with one another or integrated to said capsule.
20: PCB circuit made of fiberglass FV, tracks printed on a metal base, especially made of aluminium, or plastic laminate or tracks of folded metal or several tracks printed on both faces of the circuit, faces 20a, and 20b with thermal paths 22 connecting said tracks to one another, in turn associated with a metal support or body for dissipating the heat of the LEDs, such as polyester adhered to said metal base 23, for example.
21: PCB or part of the PCB housing the protective circuit of the LEDs which can be integrated in the circuit 20 forming a single PCB or separated to better dissipate the temperature or to prevent the theft of a part of signal, especially the D2G in the plate glass G1.
Ve: Air inlet or outlet hole which is part of the thermal interface tiN and prevents condensation inside the device.
Ob1: It is the outdoor incident light on the optical interface oiN light emitters 20, reflectors 12, intermediate optical devices Op, light guides GL, or collimators Co.
Ob2: It is the reflected light to prevent outdoor incidence and improve the contrast.
9: Inner reflective or prismatic deflecting surface of the light of the actual signal inside the member 8 for directing it to another outlet surface Sw visible to the driver Dv as an operating indicator.
4: Transparent solid part forming the complex optical body.
7, 7c: Reflective cones distributing and homogenizing the light emitted towards the light outlet mirror Mpr.
Mpr: Prismatic light outlet mirror with a surface which is smooth, engraved or faceted with an approximate inclination of 45° with respect to the light distribution plane P.
9: Reflective surfaces or covers preventing the escape of light in said body 4 in its course of distribution—reflection of the light, integrated by a metal-coated part or a cover painted with a reflective material, it covers a large part of the outer surfaces of the body 4 except the inlet 6, or 7 and light outlet 11.
1c: it crowns part of the transparent cover preventing the side diffusion of the light when the outer transparent cover 1 of the front module D1 has several windows.
11: Smooth, engraved or faceted light outlet surface which directs a light beam towards the rear Rb visible to the eye points Rv of behind the vehicle.
iP: Associated reflection parabolas with an irregular perimeter and shape for one or more LEDs per cavity, said cavities have a smooth, engraved or faceted surface, and their design corresponds to irregular shapes which fit with another similar inverted shape such that they allow optimizing the space remaining between cavities with circular or oval closed shapes, this type of cavity is preferably used for signals of the group D1 to the front, such as the fixed signal FL.
Pb: reflection parabolas or paraboloidal cavities at least occupied by a Led, each of them for the purpose of concentrating the light emission especially in the front signal FL the axes Fb1, Fb2 of which are preferably parallel, obtaining integral light beams to intensify the final result of the light emitted from said front signal FL.

The Leds of said signal FL are located in one and the same plane or in associated substantially parallel planes for the same reason of obtaining integral light beams to intensify the result of the emitted signal.

For all the embodiments and especially applicable to the light modules or devices continuously switched on, the latter have a thermal interface tiN cooling the light source by means of a heat transmission chain based on the proximity of elements from said LEDs 30, until transmitting the heat outside said device or module, comprising at least one of the following elements, or a combination thereof:

- a supporting printed circuit 20 with tracks that are widened around said LEDs 30.
- thermal paths 22 traversing said supporting circuit 20 for transmitting the heat of a first face (20a) to a second face 20b, opposite said first face 20a,
- a metal base 23 abutting with said second face 20b of the supporting circuit 20, and
- an additional inner cover R made of metal or heat conducting material, abutting with said metal base 23, having flaps aR, or outer ventilation channels.

In order to obtain a contrast on the low-intensity light emitted by said operating indicators of one or more described light colors Sw, Swe, Sw2, D2b, the latter have, for some embodiments, their small windows on a structural opaque part or opaque partition visible to the eyes of the driver Dv of the vehicle; said opaque parts can be part of the structural frame Fr, in most cases it is the inner part of said frame or opaque partition Fri, i.e., a portion of the inner part of the structural part Fr forming a perimetric frame, and delimits the bottom of said outer recess 19, or a side wall of said central recess 39 or part of the structure 10 of the module D2 itself, or said opaque partition Fri is a cover of said inner recess 29, which covers a part of the second light module D2 once it is housed in the inner recess 29, or for the embodiment in which the module towards the rear D2 is a module which is in the plate glass D2G, said opaque partition forms part of the frame FrG of the main plate glass G1 or auxiliary plate glass G2.

For one embodiment, at least one of said light modules D1, D1a, D1b, D1c, D2, D2G, D2a, comprises in its respective cavities technical means of a light emitting electro-optical interface eiN, oiN comprising at least one of the following elements, or a combination thereof; which allows developing with one and the same design configuration and one and the same electro-optical interface eiN, performing more than one function, varying their periodic emission frequency, or their emission intensity of continuous light, or of light perceived as continuous, or the light emission color.

They comprise:
- reflective surfaces 12 that are metal-coated or of any color including black;
- reflective cavities comprising parabolas Pb and having regular or irregular perimeters iP, especially with parallel axes for the front signal FL;
- flexible supporting circuits 20, partly flexible, rigid or of several associated and interconnected plates, or printed on one or two faces 20a, 20b, for direct light emission;
- LEDs 30 inserted or assembled in equal or different positions normally or at an angle of 0° a 90° with respect to said supporting circuits of fiber 20, or flexible 20F, metal 23 on interconnected associated plates or folded metal or the combination thereof, preferably in parallel planes for the front signal FL;
- at least one collimator Co or reflective surface having small associated facets, arranged for receiving the light emitted in a manner tangential almost parallel to said outer transparent or translucent cover 1, 11, and reflecting it axially for emitting indirect light;
- light guides GL substantially parallel to the outer transparent surface for indirect light emission; and
- optical devices, Fresnel-type optical devices or interpolated prismatic optical devices Opr, or concentrating optical devices Op between the light emitters 30 and the outer transparent surface 1 or 1a, for the direct light emission such as, for example, see a group of intermediate prismatic lenses Opr in FIG. 6 in the turn signal which occupies the cavity D1a and the sections of FIGS. 10, 11, and 12. Or having one or several cavities or paraboloidal depressions with at least one emitter for each of them or having one or more windows for one and the same signal or using multichip LEDs with more than one chip for one and the same supporting capsule (see FIGS. 4, 6, 10, 11, 12, 13, 14). OR for a front signal FL, FIGS. 31, 32.

As can be seen in FIGS. 14 and 15, the aforementioned portion of said supporting part PG where second light module D2, D2G is located comprises an area arranged behind the main plate glass G1 (see FIG. 14) or the auxiliary plate glass G2 (see FIG. 15), as well as an area arranged between the rim of the main plate glass G1 (see FIG. 14) or of the auxiliary G2 (see FIG. 15), or of a frame thereof FrG, and said structural part forming a perimetric frame Fr.

In relation to the part of the first D1 or second D2, D2G light module comprising the aforementioned opaque wall Cp, the latter forms part, for one embodiment, of an inner rear wall or part of an inner supporting body 10 or of an electro-optical interface iN of said first D1 or second D2 light module, and is opposite its respective outer transparent or translucent cover 1, 11. Specifically, for the embodiment illustrated by FIG. 9, part of the inner supporting body 10 of the first light module D1 forms the opaque wall Cp which covers a part of the second light module D2.

For the embodiment illustrated in FIG. 29, the aforementioned second front opening Op2 extends towards the rear until intersecting with the structural part Fr forming said perimetric frame, said first and second light modules D1, D2 being arranged one after the other, establishing contact between the outer transparent or translucent covers 1, 11 thereof.

For the embodiment illustrated by FIG. 16, the aforementioned opaque partition forms part of the frame FrG of the auxiliary plate glass G2, such that it is arranged between the rim of said auxiliary plate glass G2 and the transparent or translucent cover 11 of the second light module D2G, projecting towards the rear with respect to the auxiliary plate glass G2, substantially concealing said opaque partition FrG with respect to the tangential vision Tv of the eyes of the driver of the vehicle Dv, the outer transparent or translucent cover 11 through which the second light module D2G emits the mentioned turn signal towards the rear the focal axis Rb of which is visible at eye points located behind the rear-view mirror and outside said vehicle Rv.

For another embodiment (see FIG. 19), the opaque partition forms part of the frame FrG of the main plate glass G1.

For the embodiments described above for which the structural part Fr forming a perimetric frame defines a recess 19, 29, 39, the mentioned opaque partition is arranged at the height of said recess 19, 29, 39 (see FIGS. 5, 7, 8, 9, 11, 18a, 18b, 20 and 23), substantially concealing, with respect to the tangential vision Tv of the eyes of the driver of the vehicle Dv, the outer transparent or translucent cover 1 through which the second light module D2 emits the mentioned turn signal towards the rear the focal axis Rb of which is visible at eye points located behind the rear-view mirror and outside said vehicle Rv.

For the case in which the recess is an outer recess 19 (see FIG. 9) or a central recess 39 (see FIG. 11), the opaque partition forms part of the inner part Fri of said structural part forming a perimetric frame Fr, and for the case in which the recess is an inner recess 29, the opaque partition forms part of the inner body 10 of the second light module D2 (see FIG. 10), of another element thereof or is a plate (not illustrated) of said inner recess 29, which covers a part of the second light module D2 once it is housed in the inner recess 29.

The opaque partition Fri, FrG has an opening or window Sw (see FIGS. 5-12, 14-21, and 23) which allows part of the light signal emitted by the second light module D2, D2G to be able to be seen at least in a direct direction dv from the eyes of the driver of the vehicle Dv.

As seen in FIGS. 8 to 12 said window Sw is taken up by a transparent or translucent part traversed by part of the light signal emitted by the second light module D2, D2G with a focal axis towards the rear Rb visible at eye points located behind the rear-view mirror and outside said vehicle.

Said transparent or translucent part is, for the embodiments illustrated by said FIGS. 8 to 12, a transparent or translucent member 8 the outer surface of which is smooth, engraved or has microfacets, and is integrated in said transparent or translucent part 4 of the second light module D2, D2G.

At least one of said light modules or devices D1, D1a, D1b, D1c, D2, D2G, D2a is susceptible of being changed with another similar part provided with one or more signal emitting modules with equal or different functions or with at least one module of different design.

A person skilled in the art could introduce changes and modifications in the embodiments described without departing from the scope of the invention as it is defined in the attached claims.

What is claimed is:

1. A multi-signal exterior rear-view mirror assembly for a vehicle, of the type comprising:
    a structural part forming a perimeter frame (Fr) defining the contour of a first opening towards the rear (Op1), with reference to the axis of travel of the vehicle (500) in its normal traveling direction, said perimeter frame encompassing a main reflective plate glass (G1, G2);
    at least one second opening (Op2) for the passage of light, in an outer wall of a casing or surrounding structure of said rear-view mirror assembly in an area behind said main plate glass (G1);
    a first light module (D1) suitable for emitting at least one first turn signal through said second opening (Op2) provided with a transparent or translucent cover (1) for the passage of light emitted at least in a horizontal plane between a direction (102F) towards the front and towards the side, with reference to said axis of travel of the vehicle in its normal traveling direction;
    a second light module (D2) suitable for emitting at least one second turn signal towards the rear through a transparent or translucent cover (11), synchronized with said first turn signal for producing one and the same function, said second light module (D2) being independent in construction from the first light module (D1)
    wherein a portion of said structural part forming said perimeter frame (Fr) defines at its outer area, or in an area intermediate between said outer area and an internal part (Fri) of said frame (Fr) a recess (19, 29) in which said second light module (D2) is at least in part housed;
    said recess (19, 29) including an opaque partition that substantially conceals the mentioned turn signal towards the rear with respect to the eyes of the driver; and
    said opaque partition has an independent exit light emitted by the module (D2) by the way of an opening such as a small window (Sw), which allows that at least one beam of light (dv) that is part of said light signal emitted to the rear by said second light module (D2) to be seen by the eyes of the driver of the vehicle (Dv).

2. The rear-view mirror assembly according to claim 1, wherein said light modules (D1, D2, D2G) are electrically interconnected (iC) and controlled by a control system for emitting their respective light signals in unison or synchronously.

3. The rear-view mirror assembly according to claim 1, wherein said first light module (D1) is an integrated multisignal module having independent inner cavities for housing, in addition to a first light device (D1a) for emitting said turn signal, at least one second light device (D1b) and a third light device (D1c) for emitting a fixed white light locating signal towards the front (FL) wherein the vehicle includes two rear-view mirror assemblies arranged at each side of the vehicle with their turn signals and white light locating signals operating simultaneously.

4. The rear-view mirror assembly according to claim 1 wherein said first light module (D1) is an integrated multisignal module having independent inner cavities for housing, in addition to a first light device (D1a) for emitting said turn signal, at least one second light device (D1b) and a third light device (D1c) for emitting a fixed yellow light locating signal towards the side (SL) which operates simultaneously with another alike signal emitted from a rear-view mirror assembly arranged on another side of the vehicle.

5. The rear-view mirror assembly according to claim 1, wherein said portion of said structural part forming a perimeter frame (Fr) where said second light module (D2) is located at a portion of the structural part (Cp) of said rear-view mirror assembly farthest from the bodywork (Car) of the vehicle.

6. The rear-view mirror assembly according to claim 1, wherein said second light module (D2) abuts with a coupling area (49) of said portion of said structural part forming a perimeter frame (Fr) o of said casing cover (C, Cc) adjacent to said perimeter frame.

7. The rear-view mirror assembly according to claim 1, wherein said outer transparent or translucent covers (1, 11) are adjacent and placed one after another separated by an opaque wall (Cp) between the first light module (D1) and the second light module (D2), said opaque wall (Cp) covering part of the inner structure or interface (eiN) of at least one of said light modules (D1, D2).

8. The rear-view mirror assembly according to claim 1, wherein said second light module (D2) is also suitable for emitting a light signal (WL) with a function independent from that of said turn signal, said independent function being a function of lighting, with any light color, of an area (Da) of the bodywork (Car) on the door of said vehicle activated before the driver gets in or out of the vehicle by means of a remote control, automatically or when opening or closing the door.

9. The rear-view mirror assembly according to claim 3, wherein said second light device (D1b) and third light device (D1c) for emitting said fixed white light locating light signal (FL) towards the front uses a controlling circuit which stabilizes the current of a light source by means of digital or analog pulses with a cyclic on and off interval represented by zero and one, with a frequency greater than 20 Hz, so as to be perceived as a light that is switched on continuously for the human eye and to emit light at two different intensities.

10. The rear-view mirror assembly according to claim 9, wherein said second light device (D1b) and third light device (D1c) for emitting said fixed white light locating light signal (FL) towards the front emits said light signal during the day when the vehicle starts and no longer emits or reduces its intensity automatically when switching on lights of said vehicle.

11. The rear-view mirror assembly according to claim 1, wherein at least one of said light modules includes a cooling system or a thermal interface (tiN) to evacuate the heat of a light source comprising, at least one of the following elements, or a combination thereof:
- a supporting printed circuit (20) with tracks that are widened around said light source,
- thermal paths (22) traversing said supporting printed circuit (20) for transmitting the heat from a first face (20a) to a second face (20b), opposite said first face (20a),
- a metal base (23) abutting with said second face (20b) of the supporting printed circuit (20), or with a partially flexible circuit or with interconnected plates, and
- an additional inner cover (R) made of a metal or of a good heat conducting material, abutting with said metal base (23), having flaps (aR), or outer ventilation channels, and
- at least an opening (Ai, Ai1, Ai2) with a device to capture water or a valve in order to equilibrate its internal or external atmosphere, or in an external casing cover (C, Cc) in order to facilitate the flow of air.

12. The rear-view mirror assembly according to claim 3, wherein at least one of said light modules comprises in respective cavities technical means of a light emitting electro-optical interface (eiN, oiN) comprising at least one of the following elements, or a combination thereof:
- reflective surfaces (12) that are metal-coated or of any color, including black;
- reflective cavities comprising parabolas and having regular or irregular perimeters (iP) and their axes parallel or not;
- flexible supporting circuits (20), partly flexible, rigid or of several associated and interconnected boards, or printed on one or two faces (20a, 20b), for direct light emission;
- LEDs (30) inserted or assembled in equal or different positions normally or at an angle of 0° to 90° with respect to said supporting circuits of fiber (20), metal (23) or folded metal or the combination thereof;
- at least one collimator (Co) or reflective surface having small associated facets, arranged for receiving the light emitted in a manner tangential almost parallel to said outer transparent or translucent cover (1, 11), and reflecting it axially for indirect emitting light;
- light guides (GL) substantially parallel to the outer transparent surface for indirect light emission; and
- optical devices, Fresnel-type optical devices or interpolated prisms (Opr) between the light emitters (30) and the outer transparent surface (1) for direct light emission, optical bodies integrated to said transparent surface (1) or integrated to said LED's (30).

13. The rear-view mirror assembly according to claim 1, wherein at least one of said light modules occupying with said transparent or translucent cover (1) one part of said external casing cover (C) has a part of said transparent or translucent cover protruding from the general profile line (CL) of said external casing (C) and outside of the volume of the surrounding casing (Vi) increasing the volume of said signal device the volume of the casing.

14. The rear-view mirror assembly according to claim 3, wherein at least in part of said first light devices (D1a, D1b, D1c) a portion of the device close to the outer transparent surface (1), is used as a protective surface (Rx) for protection against the outer incident light (Ob1) and is arranged above and close to at least an element of an electro-optical interface (eiN).

15. The rear-view mirror assembly according to claim 4 wherein at least one of said first light modules or devices (D1, D1a, D1b, D1c) which emits light towards the front-side (FL) of said vehicle is provided with a viewing camera (Cv), directed forwards-downwards, being complemented with the light emission of said light module or device (D1, D1b) to facilitate viewing of the viewing camera (Cv), even with infrared light emission to operate in any condition.

16. The rear-view mirror assembly according to claim 4 wherein said light devices are independent modules or at least one of them is independent from a sub-set of devices interconnected in a multi-signal module.

17. A multi-signal exterior rear-view mirror assembly for a vehicle, of the type comprising:
- a structural part forming a perimeter frame (Fr) defining the contour of a first opening towards the rear (OP1), with reference to the axis of travel of the vehicle (500) in its normal traveling direction, said perimeter frame encompassing a main reflective plate glass (G1, G2);
- at least one second front opening (Op2) for the passage of light, in an outer wall of a casing or surrounding structure of said rear-view mirror assembly in an area behind said main plate glass (G1);
- a first light module (D1) suitable for emitting at least one first turn signal through said second opening (Op2) provided with a translucent or transparent surface (1) for the passage of light emitted at least in a horizontal plane between a direction (102F) towards the front and towards the side, with reference to said axis of travel of the vehicle in its normal traveling direction
- a second light module (D2G) suitable for emitting at least one second turn signal at least towards the rear through a transparent or translucent surface (11), synchronized with said first turn signal for producing one and the same function, said second light module (D2G) being independent in construction from the first light module (D1), and said second light module (D2G) being located in a housing at a peripheral portion of said main reflective plate glass (G1, G2) adjacent an inner part of said frame (Fri);
- said housing (29) including an opaque partition (FrG) that substantially conceals the mentioned turn signal towards the rear with respect to the eyes of the driver; and
- said opaque partition has an independent exit for the light emitted by said second light module (D2G) by the way of an opening such as a small window (Sw, Swe), which allows that at least one beam of light (dv) that is a part of said light signal emitted to the rear by said light module (D2G) to be seen by the eyes of the driver of the vehicle (Dv).

18. The rear-view mirror assembly according to claim 4, wherein said second light device (D1c) and third light device (D1c) for emitting said fixed yellow light locating signal (SL) towards the side, uses a controlling circuit which stabilizes the current in each light source by means of digital or analog pulses with a cyclic on and off interval represented by zero and one, with a frequency greater than 20 Hz, such that it is perceived as a light that is switched on continuously for the human eye.

* * * * *